United States Patent
Lim et al.

(10) Patent No.: US 8,892,071 B2
(45) Date of Patent: Nov. 18, 2014

(54) SYSTEM FOR MANAGING UNREGISTERED TERMINALS WITH SHARED AUTHENTICATION INFORMATION AND METHOD THEREOF

(75) Inventors: Han Na Lim, Seoul (KR); Sung Won Lee, Gyeonggi-do (KR); Beom Sik Bae, Gyeonggi-do (KR)

(73) Assignees: Samsung Electronics Co., Ltd (KR); Kyung Hee University Industry Academic Cooperation Foundation (KR)

( * ) Notice: Subject to any disclaimer, the term of this patent is extended or adjusted under 35 U.S.C. 154(b) by 633 days.

(21) Appl. No.: 12/848,555

(22) Filed: Aug. 2, 2010

(65) Prior Publication Data
US 2011/0028126 A1  Feb. 3, 2011

(30) Foreign Application Priority Data
Jul. 31, 2009 (KR) ................. 10-2009-0070560

(51) Int. Cl.
H04W 12/06 (2009.01)
H04L 29/06 (2006.01)
H04W 88/04 (2009.01)

(52) U.S. Cl.
CPC .......... H04W 12/06 (2013.01); H04L 63/0884 (2013.01); H04L 63/0853 (2013.01); H04W 88/04 (2013.01)
USPC ........................ 455/411; 455/558; 455/435.1

(58) Field of Classification Search
None
See application file for complete search history.

(56) References Cited

U.S. PATENT DOCUMENTS

| 6,466,804 | B1* | 10/2002 | Pecen et al. ................. 455/558 |
| 2004/0042442 | A1 | 3/2004 | Pecen et al. |
| 2004/0152446 | A1* | 8/2004 | Saunders et al. ............. 455/411 |
| 2004/0180657 | A1 | 9/2004 | Yaqub et al. |
| 2006/0190601 | A1* | 8/2006 | Lee et al. .................... 709/225 |
| 2008/0081611 | A1 | 4/2008 | Hoyt et al. |
| 2010/0035613 | A1* | 2/2010 | Schroter .................. 455/435.1 |

FOREIGN PATENT DOCUMENTS

KR  100796525  1/2008

* cited by examiner

*Primary Examiner* — German J Viana Di Prisco
(74) *Attorney, Agent, or Firm* — The Farrell Law Firm, P.C.

(57) ABSTRACT

Provided are a system and method for managing unregistered devices with authentication information sharing. The method includes receiving an authentication information duplication request from the unregistered device by the registered device, obtaining authentication information from a Universal Subscriber Identity Module (USIM) by the registered device when the registered device receives the authentication information duplication request, and transmitting the obtained authentication information to the unregistered device by the registered device.

12 Claims, 22 Drawing Sheets

SYSTEM FOR MANAGING UNREGISTERED TERMINALS WITH SHARED AUTHENTICATION INFORMATION AND METHOD THEREOF

PRIORITY

This application claims priority under 35 U.S.C. 119(a) to an application filed in the Korean Intellectual Property Office on Jul. 31, 2009, and assigned Serial No. 10-2009-0070560, the contents of which are incorporated herein by reference.

BACKGROUND OF THE INVENTION

1. Field of the Invention

The present invention relates generally to a system and method for managing unregistered terminals with sharing authentication information, and more particularly, to a system and method for managing unregistered terminals sharing authentication information with a registered terminal.

2. Description of the Related Art

In recent years, Orthogonal Frequency Division Multiple Access (hereinafter OFDMA) or Single Carrier-Frequency Division Multiple Access (hereinafter SC-FDMA) have been actively studied as methods available for high-speed wireless channel data transmission in a mobile communication system. As the 3rd Generation Partnership Project (3GPP) being an asynchronous cellular mobile communication standard Institute, a Long Term Evolution (LTE) system based on a multiple access method is being developed as a next generation mobile communication system.

Practically, a user purchases a mobile communication portable phone together with a device for storing authentication information such as a Universal Subscriber Identity Module (USIM) or a Universal Integrated Circuit Card (UICC) for a corresponding mobile terminal at the purchase time and inserts the storing device in a corresponding communication terminal. Through this, the corresponding communication terminal is recognized by a wireless broadband communication network as legal user and device, and communication service is possible. In particular, billing is charged for an authentication device such as a corresponding USIM/UICC card.

Accordingly, a user desiring to use a plurality of wireless broadband terminals should purchase an authentication device such as a USIM/UICC card each time a terminal providing a wireless broadband communication function is purchased, and mount the device in a corresponding wireless communication terminal.

Moreover, to access devices such as cameras, notebook computers, and Motion Pictures Experts Group (MPEG) Layer Audio 3 (MP3) players a wireless broadband communication network, and to receive services therefor, a mobile communication terminal mounting the foregoing authentication device therein should be used. This method refers to a relay mode.

FIG. 1 illustrates a communication method based on a relay mode of devices in accordance with the prior art.

Referring to FIG. 1, a portable phone 2 provides a wireless communication function and accesses a wireless broadband communication network 1. Application services through real communication are performed in an external device such as a notebook computer 3 that is connected by a wired or wireless line. A communication service fee is charged with respect to the portable phone 2.

Several problems are realized by such an arrangement on the user's side. First, a plurality of USIM cards should be mapped to self-billing. Namely, each time a user purchases a device providing a wireless broadband communication function, the device must be associated with self billing. Accordingly, when there are plural enterprisers or an enterpriser charges a separate billing with respect to respective USIM cards, the user inconveniently receives plural notices, which increases the likelihood that such notices are lost.

When a device providing a rarely used wireless broadband communication function is misplaced, a USIM card can be lost due to another person's malicious intent. In this case, it is difficult to solve billing problems when a user does not use services until a corresponding subscriber recognizes the problems.

Another important user issue concerns infrequently used wireless broadband communication functions. For example, a user always carries a portable phone, and turns-on power for 24 hours and calls frequently. However, with a camera, there is a significant difference between the photographing numbers according to persons, and a user does not transmit photographs anywhere through a wireless communication function. With a game machine, a wireless communication function is activated when playing an on-line game.

In particular, a communication function in an MP3 player may be only briefly used for downloading several sound sources. Accordingly, a wireless broadband communication technology has been gradually applied. However, compared with a portable phone, in a terminal without using a wireless communication function, a separate purchase and application of an authentication device such as a USIM is inconvenient for a user, and is cost-ineffective for a user and an enterpriser's management.

It is possible to separate a USIM card from a portable phone to insert it into a camera, a notebook computer, an MP3 player, or a game machine when necessary. However, a voice phone function is inconveniently stopped such that the most necessary service is disabled for a certain time.

SUMMARY OF THE INVENTION

The present invention has been made in view of at least the above problems, and provides a method for sharing a USIM (or subscriber/terminal authentication/ registration) of a authenticated and registered wireless broadband terminal with unauthenticated and unregistered consumer electronic/embedded devices supporting a wireless broadband communication technology during a legally optional period, and a system thereof.

The present invention further provides a method for managing a consumer/embedded device sharing authentication information supporting a wireless broadband communication technology, and a system thereof.

In accordance with an aspect of the present invention, a method for sharing authentication information with an unregistered terminal by a registered terminal in a wireless communication network includes receiving an authentication information duplication request from the unregistered terminal by the registered terminal, obtaining authentication information from a USIM by the registered terminal when the registered terminal receives the authentication information duplication request, and transmitting the obtained authentication information to the unregistered terminal by the registered terminal.

In accordance with another aspect of the present invention, a registered terminal for sharing authentication information with an unregistered terminal in a wireless communication network includes a wired and wireless interface for receiving an authentication information duplication request from the unregistered terminal and sending the received authentication information duplication request to a main processor, receiving the authentication information corresponding to the authentication information duplication request from the main processor and transmitting the received authentication information to the unregistered terminal, and a processor for obtaining the authentication information from a USIM when the wired and wireless interface receives the authentication information duplication request, and sending the obtained authentication information to the wired and wireless interface.

In accordance with another aspect of the present invention, a method for sharing authentication information with a registered terminal by an unregistered terminal in a wireless communication network includes transmitting an authentication information duplication request to the registered terminal by the unregistered terminal, receiving authentication information corresponding to the authentication information duplication request from the registered terminal by the unregistered terminal, and accessing the wireless communication network using the received authentication information by the unregistered terminal.

In accordance with another aspect of the present invention, an unregistered terminal for sharing authentication information with a registered terminal in a wireless communication network includes a wired and wireless interface for transmitting an authentication information duplication request to the registered terminal, and receiving authentication information corresponding to the authentication information duplication request from the registered terminal, and a processor for accessing the wireless communication network using the received authentication information.

In accordance with another aspect of the present invention, a method for synchronizing authentication information with a registered terminal by an authentication/register management server of a wired and wireless network includes transmitting a USIM duplication list request message to the registered terminal, the USIM duplication list request message indicating an unregistered terminal list with which the registered terminal shares the authentication information, receiving a USIM duplication list corresponding to the USIM duplication list request message from the registered terminal, and storing the received USIM duplication list in a USIM duplication database of the authentication/register management server.

In accordance with another aspect of the present invention, an authentication/register management server of a wireless communication network synchronizing authentication information with a registered terminal includes a network interface for transmitting a USIM duplication list request message to the registered terminal, and receiving a USIM duplication list corresponding to the USIM duplication list request message from the registered terminal, the USIM duplication list request message indicating an unregistered terminal list with which the registered terminal shares the authentication information, and a processor for storing the received USIM duplication list in a USIM duplication database of the authentication/register management server.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

The present invention enables desired communication services of consumer electronic/embedded devices for only a necessary time, departing from previous convention wherein all wireless broadband communication devices at the time of purchase need to be opened or authenticated and registered by an enterpriser, by allowing registration and authentication information of a specific registered and authenticated wireless broadband communication device to be legally duplicated to other devices which an owner temporarily possesses or uses. This is done in consideration of an environment using consumer electronic/embedded devices capable of performing wireless broadband communication besides speech based portable terminals up to the present $3^{rd}$ generation mobile communication systems such as 3rd Generation Partnership Project (3GPP) Broadband Code Division Multiple Access (WCDMA)/High Speed Packet Access (HSPA), 3rd Generation Partnership Project 2 (3GPP2) CDMA2000, or 3.5 rd or 4-th generation mobile communication systems Mobile WiMAX, 3GPP Long-Term Evolution (LTE) are activated.

Figure 1:
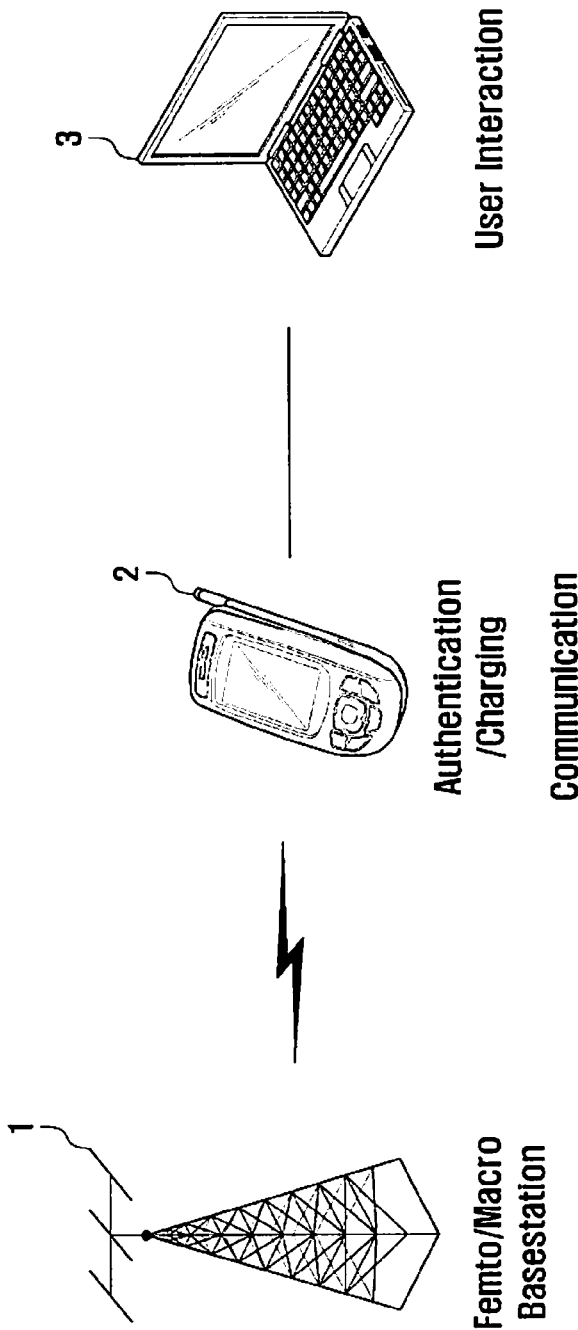
FIG. 1 illustrates a communication method according to a relay mode of devices in accordance with the related art.
Figure 2:
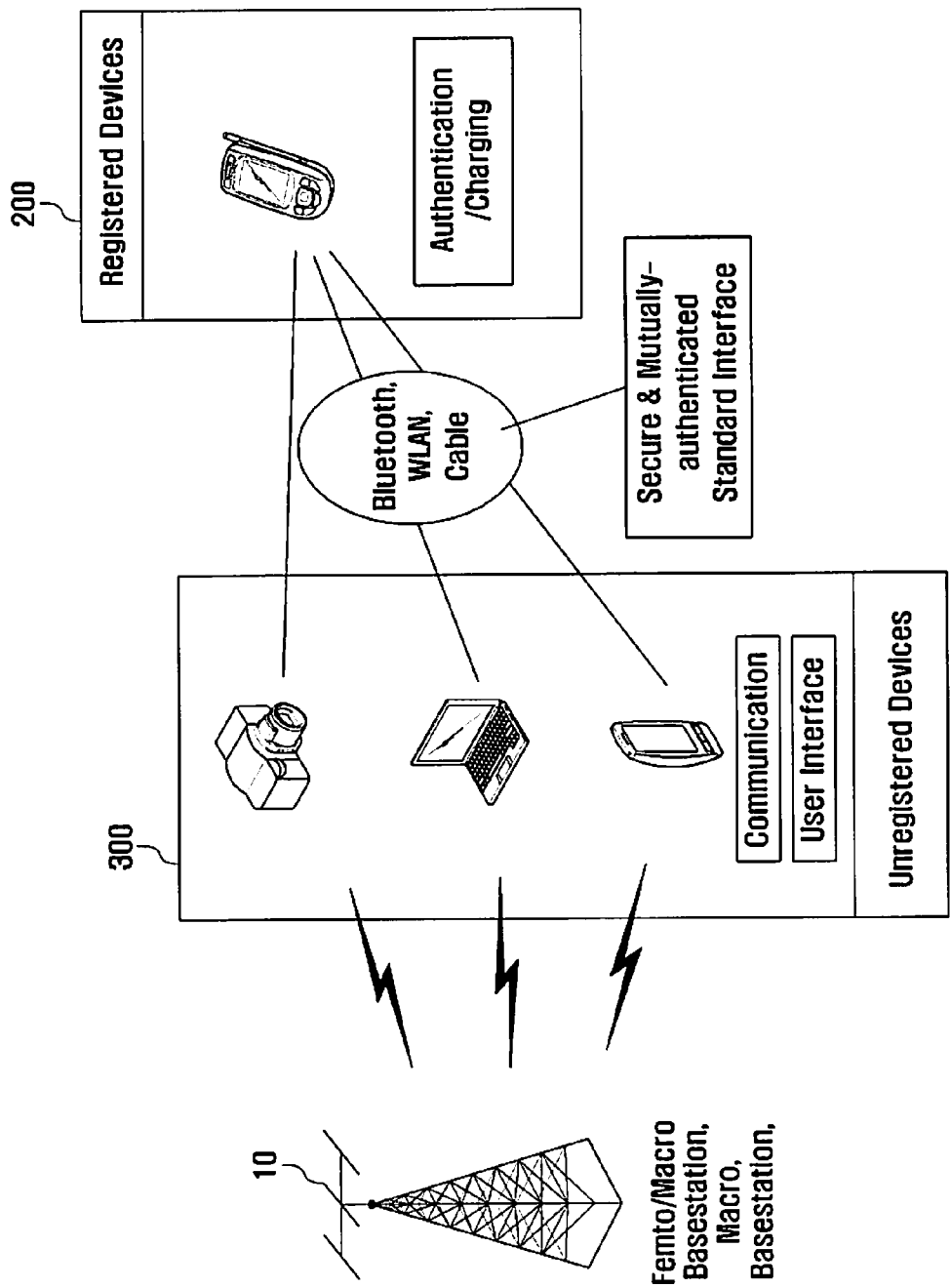
FIGS. 2 and 3 illustrate an authentication information sharing method according to an embodiment of the present invention.
Figure 3:
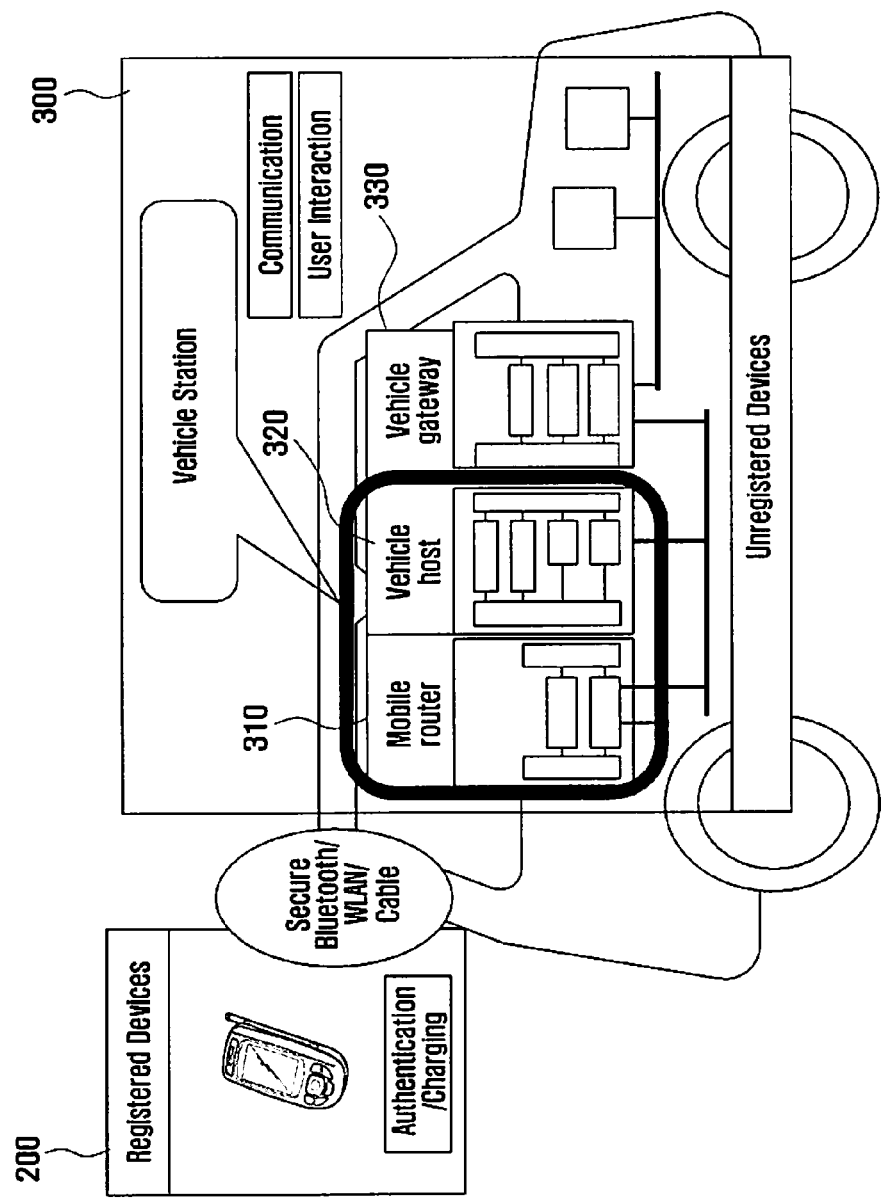

FIGS. 2 and 3 illustrate an authentication information sharing method according to an embodiment of the present invention.

Reference numeral 10 represents a wireless broadband communication network. A Femto-cell base station or an outdoor macro base station is shown in FIG. 2 as a representative example of the wireless broadband communication network 10. Registered devices 200 refers to terminals to be registered and authenticated in the wireless broadband communication network 10, and unregistered devices 300 refers to terminals not to be registered and authenticated in the wireless broadband communication network 10.

A mobile communication terminal is shown in FIG. 2 as an example of the registered devices 200, and a camera, a notebook computer, an MP player are shown in FIG. 2 as examples of the unregistered devices 300.

A camera/notebook computer/MP player in an impossible authentication and registration state are connected through wireless broadband communication as a single device to use a communication function and an application service. However, the unregistered devices 300 such as consumer electronic/embedded devices usually do not connect with the wireless broadband communication network.

Accordingly, the unregistered device 300 communicates with the registered device 200 using an authentication information sharing method according to the present invention to temporarily fetch authentication information (USIM information) of the registered device 200 and to access the wireless broadband communication network using the received authentication information. To temporarily fetch the authentication information of the registered device 200, there is a need for connection between the registered device 200 and the unregistered device 300, for which an access through a wired cable or a wireless communication function can be considered.

As shown in FIG. 2, a near distance wireless LAN, Bluetooth or wired cable is applicable. Since billing information is sent, security should be considered. Namely, sharing authentication information is performed through encrypted logical connection in a mutually authenticated state.

FIG. 3 illustrates an example in which the present invention is applied to a vehicle. Hereinafter, as shown in FIG. 3, various electronic devices are mounted in the vehicle. The electronic devices require communication with external devices.

However, if a user purchases a USIM of the car to permanently mount in the car, billing according to a multiple USIM mentioned in the related art, there arises management and security problems of the USIM, or a fee problem according to continuous communication of an electronic device in the vehicle unknown to the driver. Accordingly, when a user having a wireless broadband communication terminal enters the vehicle to operate a mobile router or consumer electronic/embedded devices therein, it is preferable to temporarily use authentication information of a corresponding registered device 200.

The mobile router of the vehicle communicates with external devices, in particular, with a registered device. A vehicle host 320 functions as a Central Processing Unit (CPU). Sharing authentication information of the registered device can be requested through the mobile router 310 and the vehicle host 320. Meanwhile, a vehicle gateway 330 is an interface for controlling electronic devices of the vehicle.

A wireless communication system according to 3GPP LTE is used as an example of a wireless communication system according to an embodiment of the present invention. However, the present invention is not limited thereto. Namely, technology of the present invention is applicable to systems operating $2^{nd}$ and 3rd Generation communication technology, and other related authentication/registration based wireless broadband communication technology.

Figure 4:
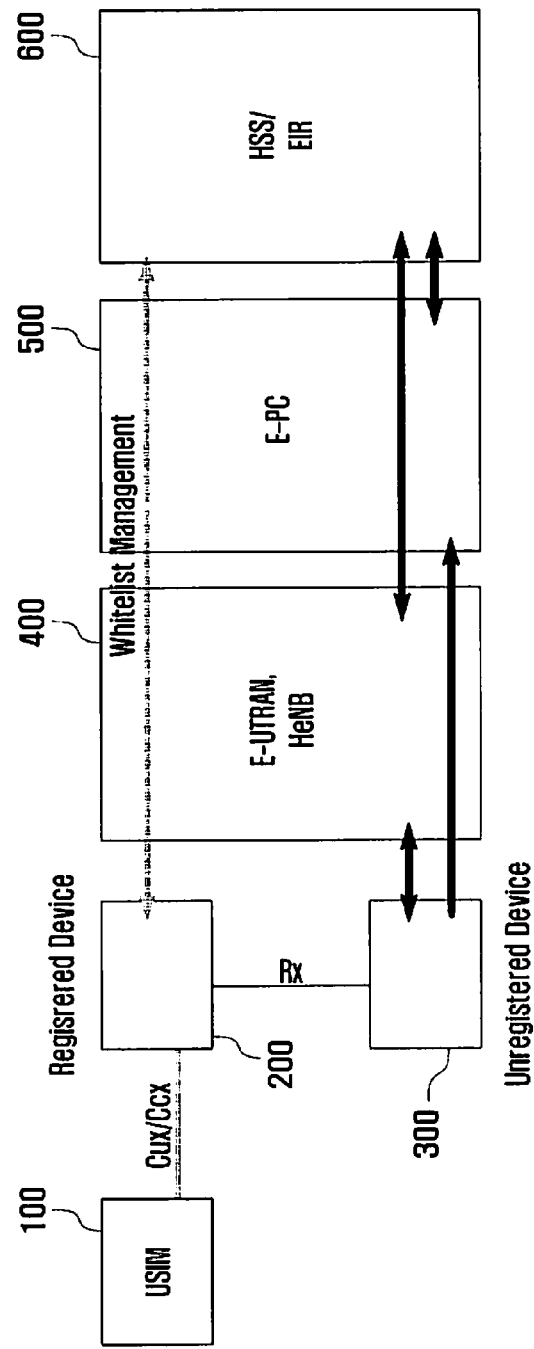
FIG. 4 illustrates a wireless communication system according to an embodiment of the present invention.

FIG. 4 illustrates a wireless communication system according to an embodiment of the present invention.

Referring to FIG. 4, the wireless communication system includes a USIM module 100, a registered device 200, an unregistered device 300, a wireless access network 400, a core network 500, and an authentication/registration management server 600.

In particular, the wireless access network 400, the core network 500, and the authentication/registration management server 600 are entities of the wireless broadband communication network 10. Evolved UMTS Terrestrial Radio Access Network)/Home Evolved Node-B (E-UTRAN/HeNB) is shown as the wireless access network 400, Evolved Packet Core (EPC) is shown as the core network 500, and Home Subscriber Service/Equipment Identity Register (HSS/EIR) is shown as the authentication/registration management server 600. This example applies the present invention to the 3GPP LTE standard. The wireless communication system according to an embodiment of the present invention is also applicable to entities of the first, second and third generation wireless broadband communication network.

First, the USIM module 100 stores a subscriber IDentifier (ID) identifying a user registered in an enterpriser serving wireless broadband communication, namely, a subscriber. The USIM module 100 stores information (authentication information) for authentication and registration corresponding to the subscriber ID which may become an International Mobile Subscriber Identity (IMSI). The authentication information may become USIM Mandatory parameter among information stored in USIM. The USIM Mandatory parameter may become Security related information, PLMN related information, and USIM Management related information.

For example, in WCDMA, the USIM Mandatory parameter includes EFIMSI(IMSI), Ciphering and Integrity Keys (EFKeys), Ciphering and Integrity Keys for a Packet Switched domain (EFKeysPS), Higher Priority PLMN search period (EFHPPLMN), USIM Service Table (EFUST), Access Control Class (EFACC), Forbidden PLMNs (EFFPLMN), Initialisation values for Hyperframe number (EFSTART-HFN), Maximum value of START (EFTHRESHOLD), and Network Parameters (EFNETPAR).

Accordingly, the authentication information may become all or a part of information stored in the USIM.

The registered device 200 and the unregistered device 300 fundamentally includes a wireless interface that may access a wireless broadband communication network. In this case, the registered device 200 and the unregistered device 300 can be inquired as to whether to directly acquire information for registering and authentication in a wireless broadband communication network.

The registered device 200 is a terminal which is registered in a wireless broadband communication network, and in which the USIM module 100 is mounted or can directly connect with the wireless broadband communication network. Namely, the registered device 200 includes a subscriber ID. A mobile communication terminal is a representative example of the registered device 200. In particular, the registered device 200 according to an embodiment of the present invention performs registration and authentication in a network using a subscriber identifier of a USIM module 100 mounted or connected.

The unregistered device 300 is one in which the USIM module 100 is not mounted and can not directly connect with the USIM module 100, and thus does not include the subscriber identifier. Meanwhile, the unregistered device 300 has a device ID for identifying devices. Such a device ID may become an International Mobile Equipment Identity (IMEI). For example, the unregistered device 300 may be a camera, notebook computer, or MP3 player.

In particular, the registered device 200 provides authentication information mapped to the subscriber ID from the USIM module 100 to the unregistered device 300. Such authentication information may include all or a part of information stored in the USIM module 100.

In particular, the authentication information may become a USIM Mandatory parameter. The registered device 200 may duplicate only the USIM Mandatory parameter mapped to a subscriber ID from the USIM module 100 and provide it to the unregistered device 300.

Accordingly, the unregistered device 300 performs registration and authentication in the wireless broadband communication network using its device identifier based on authentication information mapped to the subscriber identifier.

Entities for providing wireless sector services to devices including the registered device 200 and the unregistered device 300 are commonly referred to as the wireless access network 400. Examples of a base station and a base station controller are Evolved Node-B (eNB), Home Evolved Node-B (HeNB), and Evolved UMTS Terrestrial Radio Access Network (E-UTRAN).

The core network 50 is composed of at least one entity, and performs a role controlling the wireless broadband communication network. In particular, the core network 500 provides packet and circuit switching services to the registered device 200 and the unregistered device 300 accessing through the wireless access network 400. Evolved Packet Core (EPC) of LTE is shown to provide only the packet switching service by way of example.

The authentication/registration management server 600 may perform authentication and registration in the unregistered device 300 to use the wireless broadband communication network. The authentication/registration management server 600 can be configured by adding functions and devices according to an embodiment of the present invention to entities such as conventional Authorization, Authentication, Account (AAA), Home Subscriber Service (HSS), and Equipment Identity Register (EIR), or may be separately configured by another entity connecting with the core network 500 unlike the foregoing entities.

To register or authenticate in the wireless broadband communication network, because the unregistered device 300 uses authentication and registration information of the registered device 200, the authentication/registration management server 600 manages the information-providing registered device 200.

Namely, the authentication/registration management server 600 manages a plurality of unregistered terminal accessing a wireless communication network using the authentication and registration information of the registered terminal.

As illustrated previously, to manage the registered device 200 and the unregistered device 300 to be associated with each other, the authentication/registration management server 600 maps and stores device IDs of unregistered devices 300 using a subscriber ID of the registered device 200 to the subscriber ID, and manages the unregistered devices through stored data.

A Receive (Rx) interface is provided between the registered device 200 and the unregistered device 300 instead of a conventional R interface. The R interface is to support a relay mode. The Rx interface is used to share the authentication information of the registered device 200 legally and temporarily.

Consequently, unlike in the related art, the unregistered device 300 in the present invention has an interface directly communicating with the wireless access network 400 and the core network 500.

As described earlier, when the unregistered device 300 provides a directly accessible interface to the wireless access network 400 and the core network 500, a use may be using illegal authentication information. If so, to detect a user of illegal authentication information, the registered device 200 has an additional interface with the authentication/registration management server 600 and supports white-list management, namely, management of a user side to the illegal unregistered device through the interface.

Further, since only a name is defined in a conventional Cu/Cc interface, and the USIM module 100 and a Mobile Equipment (ME) are composed of one physical device, the interface is not needed. In the present invention, the USIM module 100 considers a structure supporting an independently processed self-communication function.

Hereinafter, for convenience of description, the USIM module 100 is described as a storage medium directly connecting with the ME. However, a case where the USIM module becomes a separate self-communication device can be equally applied in future by separately defining messages between the USIM module and the ME.

Figure 5:
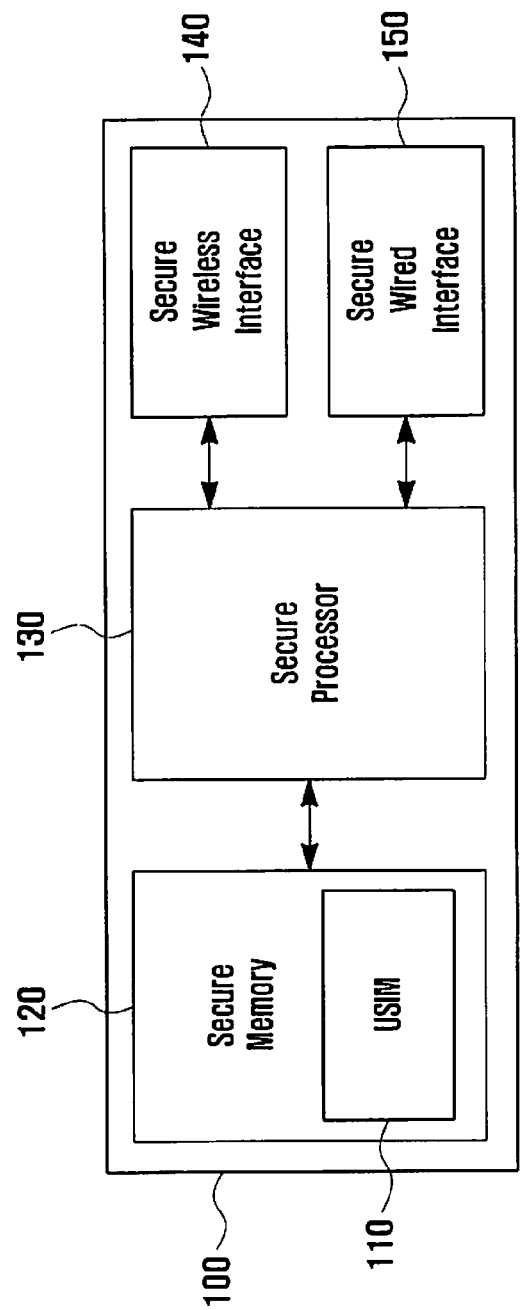
FIG. 5 illustrates a USIM module according to an embodiment of the present invention.

FIG. 5 illustrates a USIM module according to an embodiment of the present invention.

Referring to FIG. 5, the USIM module 100 includes a secure memory 120 with a USIM 110, a secure processor 130, a secure wireless interface 140, and a secure wired interface 150.

USIM/UICC IS a conventional simple storage medium, and has an independent device arrangement separately including a processor 130, communication interfaces 140 and 150, and a storage medium 120.

Since the interfaces 140 and 150, the processor 130, and the storage medium 120 have authentication information, security thereof is ensured.

An embodiment of the present invention suggests a structure enabling interface through separate messages between the registered device 200 and the USIM module 100 in comparison with an independent type USIM/UICC device. However, although the registered device 200 directly implements the USIM module 100 as a simple storage medium, message processing according to the present invention can be supported by an internal implementation processing.

Figure 6:
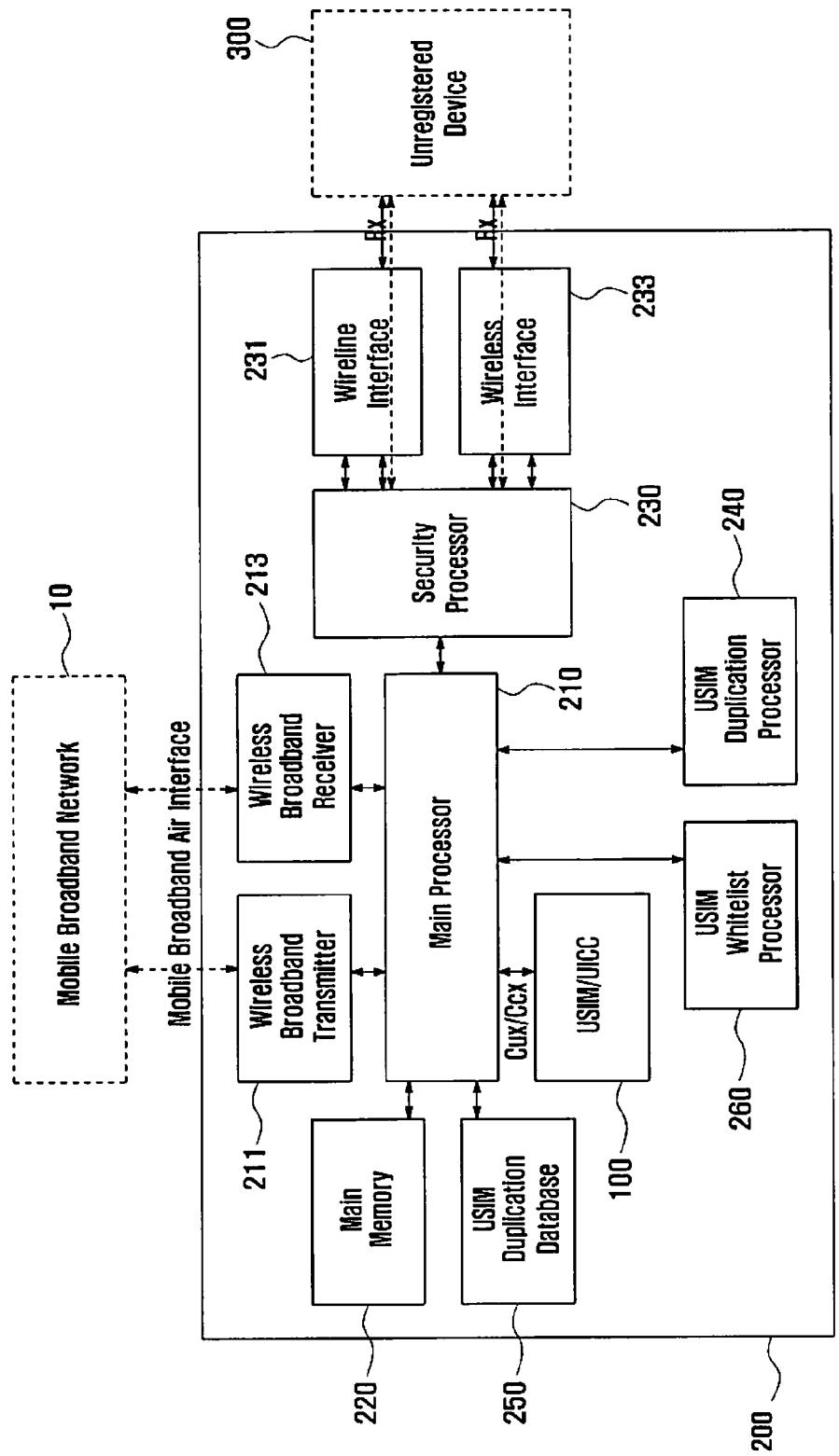
FIGS. 6 to 8 illustrate a configuration of a registered terminal according to an embodiment of the present invention.
Figure 7:
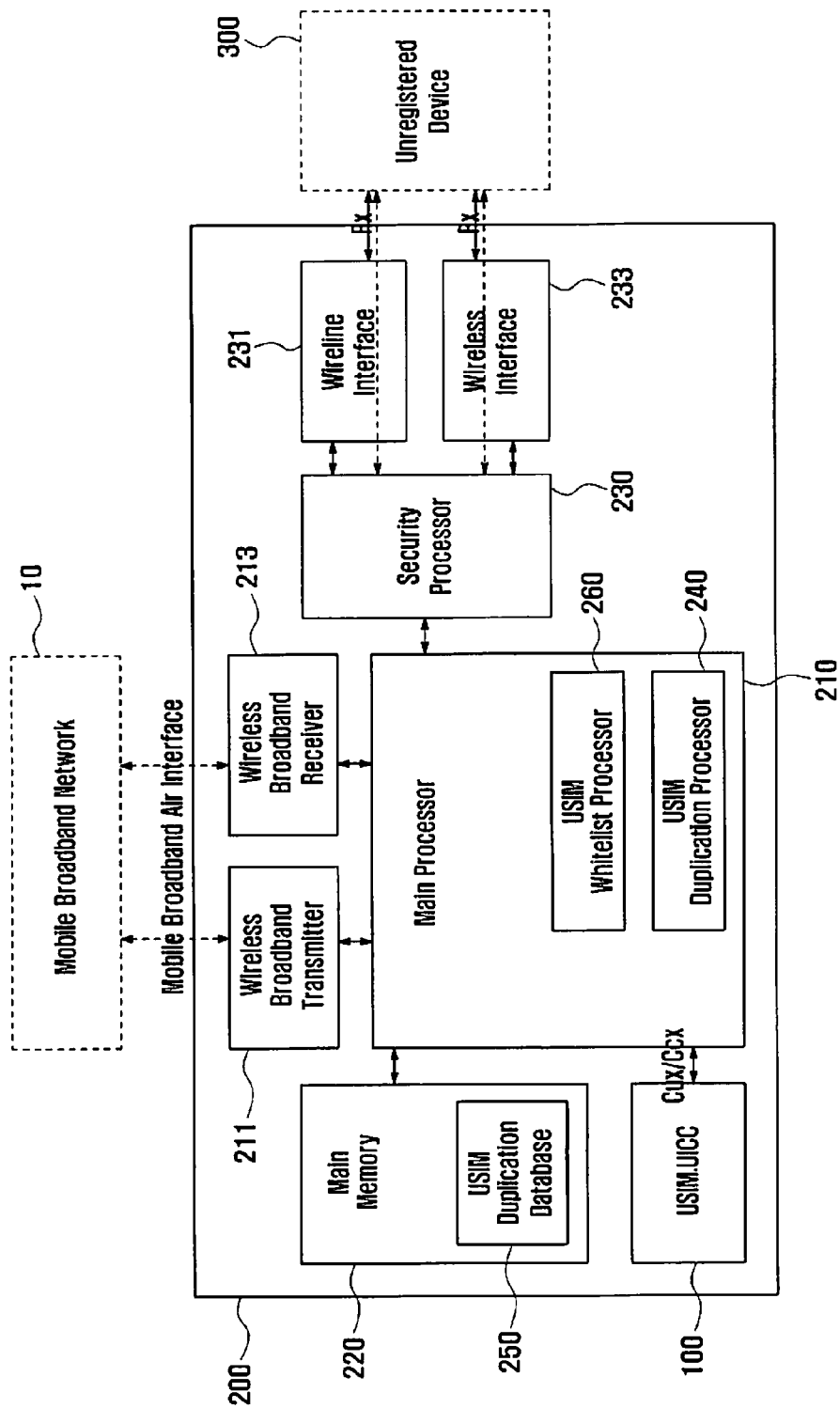
Figure 8:
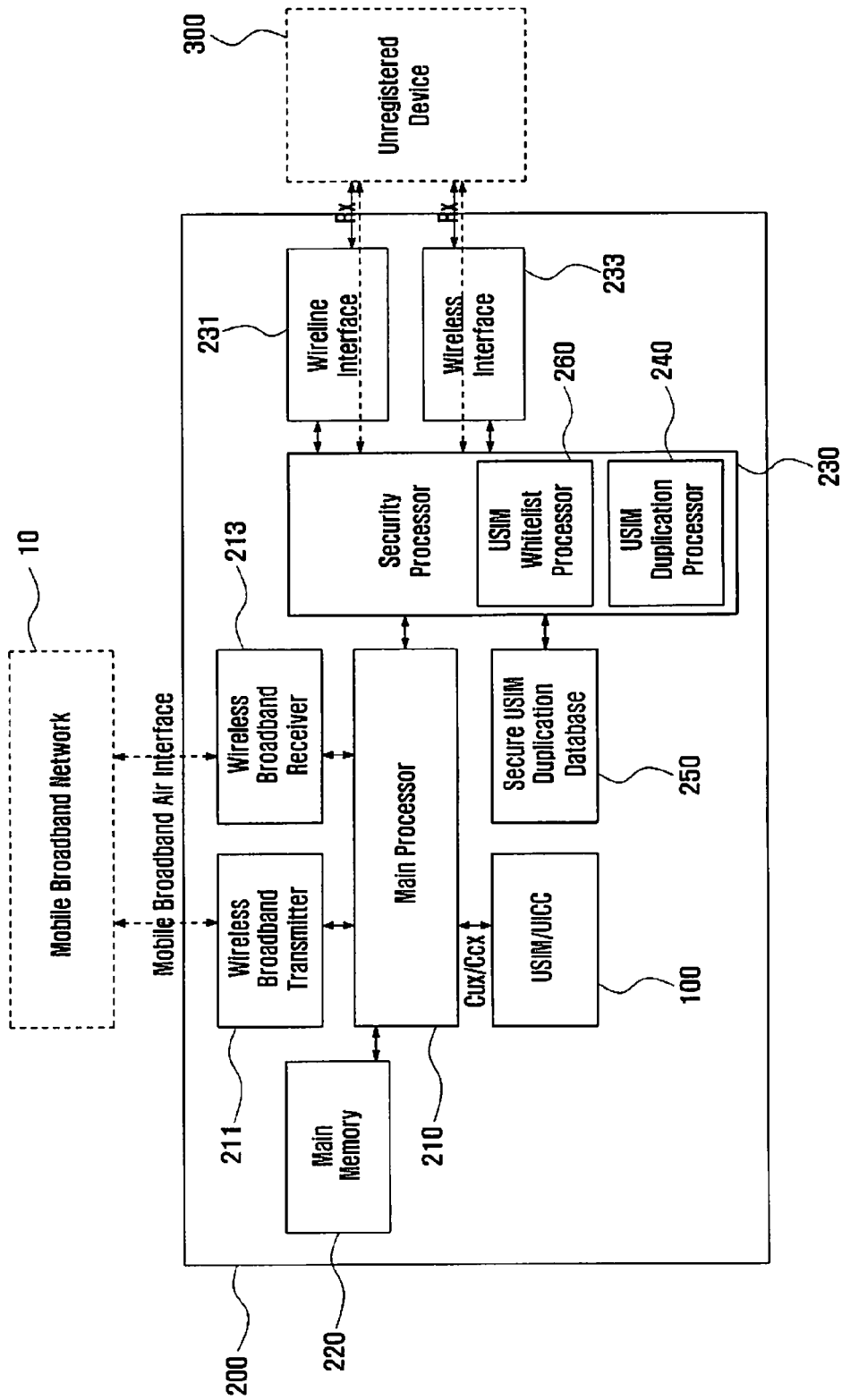

FIGS. 6 to 8 illustrate a configuration of a registered device according to an embodiment of the present invention.

Referring to FIG. 6, the registered device 200 includes a main processor 210, a wireless broadband transmitter 211, a wireless broadband receiver 213, and a main memory 220. Such an arrangement is to provide a communication function connecting with a wireless broadband network 10. Here, the main processor 210 connects with the USIM module 100.

Further, a registered device 200 additionally includes a security processor 230, wired and wireless interfaces 231 and 233, a USIM duplication processor 240, a USIM duplication database 250, and a white-list processor 260 besides the foregoing structural elements.

The security processor 230 is for an Rx interface in which security is ensured. The wired and wireless interfaces 231 and 232 provide an interface applying security with the unregistered device 300. The USIM duplication processor 240 processes an Rx interface message for providing authentication information to the unregistered device 300.

A new Cux/Ccx interface is provided between the main processor 210 and the USIM module 100, which includes messages for fetching authentication information requested from the unregistered device 300. Moreover, the USIM duplication interface 250 is a database for managing information of the unregistered devices 300 matching with the registered device 200. Namely, the USIM duplication database 250 stores information of the unregistered devices 300 to which the registered device 200 provides the authentication information. The following Table 1 describes information stored in the USIM duplication database 250 of the registered device according to an embodiment of the present invention.

TABLE 1

| SourceID | PermittedServiceOption | PermittedServiceAllowed | PermittedServicePeriod |
|---|---|---|---|
| IMEI_1 | (0) data only | 2009.07.10_18:13:25 | 60 minutes |
| IMEI_2 | (1) data + circuit voice | 2009.07.10_12:24:20 | 60 minutes |
| ... | | | |
| IMEI_n | (0) data only | 2009.07.10_17:00:05 | 360 minutes |

Table 1 is a database sharing authentication information with the unregistered device 300 that the registered device 200 manages.

As listed in Table 1, the database includes a Source IDentifier (SourceID), a Permitted Option (PermittedServiceOption), a Permitted time (PermittedServiceAllowed), and a Permitted Period (PermittedServicePeriod).

A source ID field is a device ID of an unregistered device 300 sharing authentication information, which uses IMEI.

A permission option field indicates a service that the registered device 200 permits the unregistered device 300 to use. This can include permitting general data services, permitting circuit voices therewith, permitting IMS services therewith, and a combination thereof. Further, a permitted time field indicates a sharing starting time, and a permitted period field indicates a sharing permitted period.

The white list processor 260 supports interface between the registered device 200 and the authentication/registration management server 600 to manage information with respect to a more stable unregistered device 300 in a network. FIG. 6 is a model in which a logical processor and a storage medium are respectively implemented by an independent structure. As shown in FIG. 7, a main processor 210 includes functions of the white list processor 260 and the USIM duplication processor 240 according to the implementation. It is possible to store the USIM duplication database 250 in a main memory 220 that the main processor 210 largely accesses.

As shown in FIG. 8, the USIM duplication processor 240 and the white list processor 260 may be included in the security processor 230 to emphasize security elements, and the USIM duplication database 250 may be implemented in a secure memory so that only the security processor 230 accesses the USIM duplication database 250.

Figure 9:
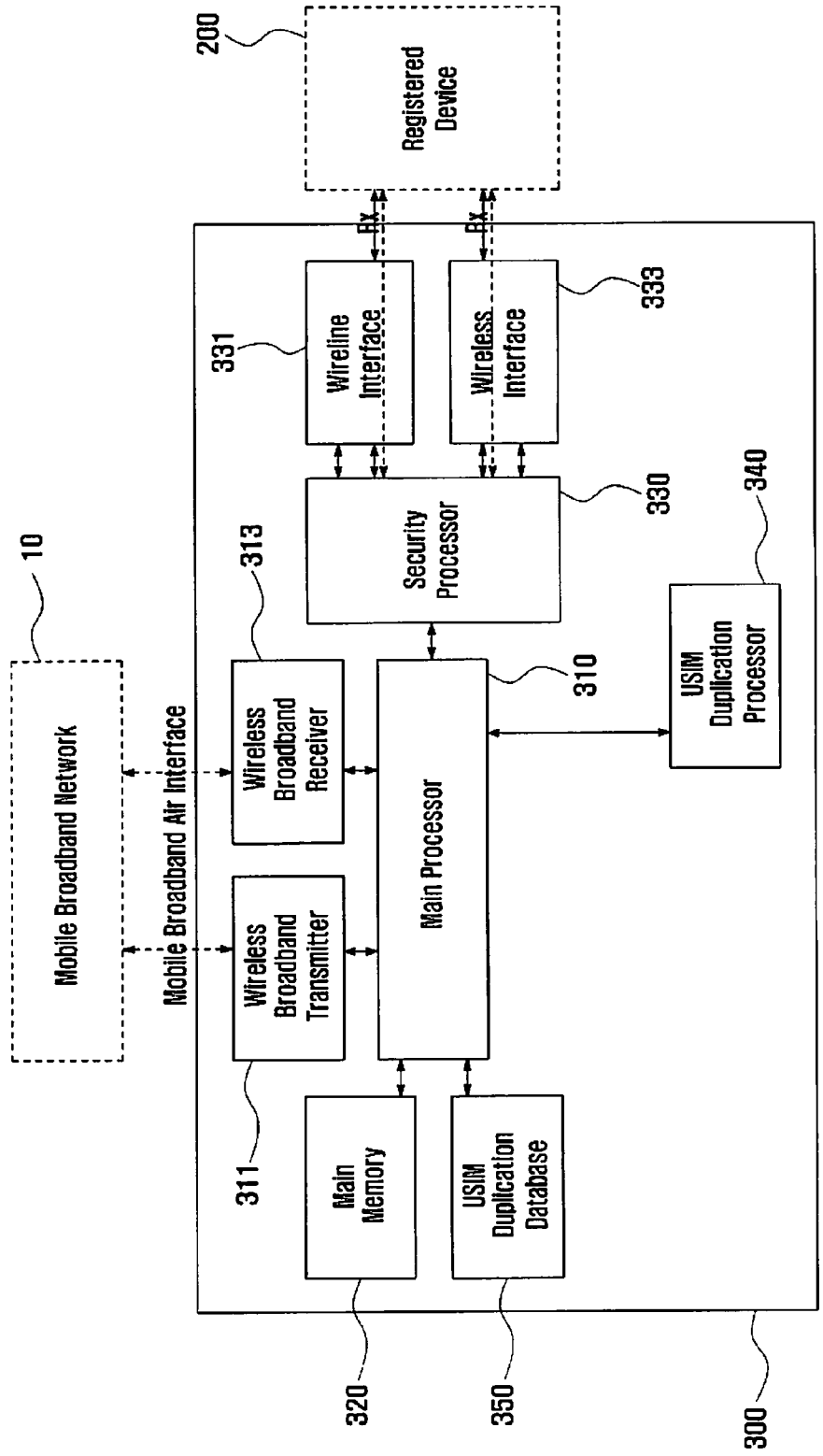
FIGS. 9 to 11 illustrate a configuration of an unregistered terminal according to an embodiment of the present invention.
Figure 10:
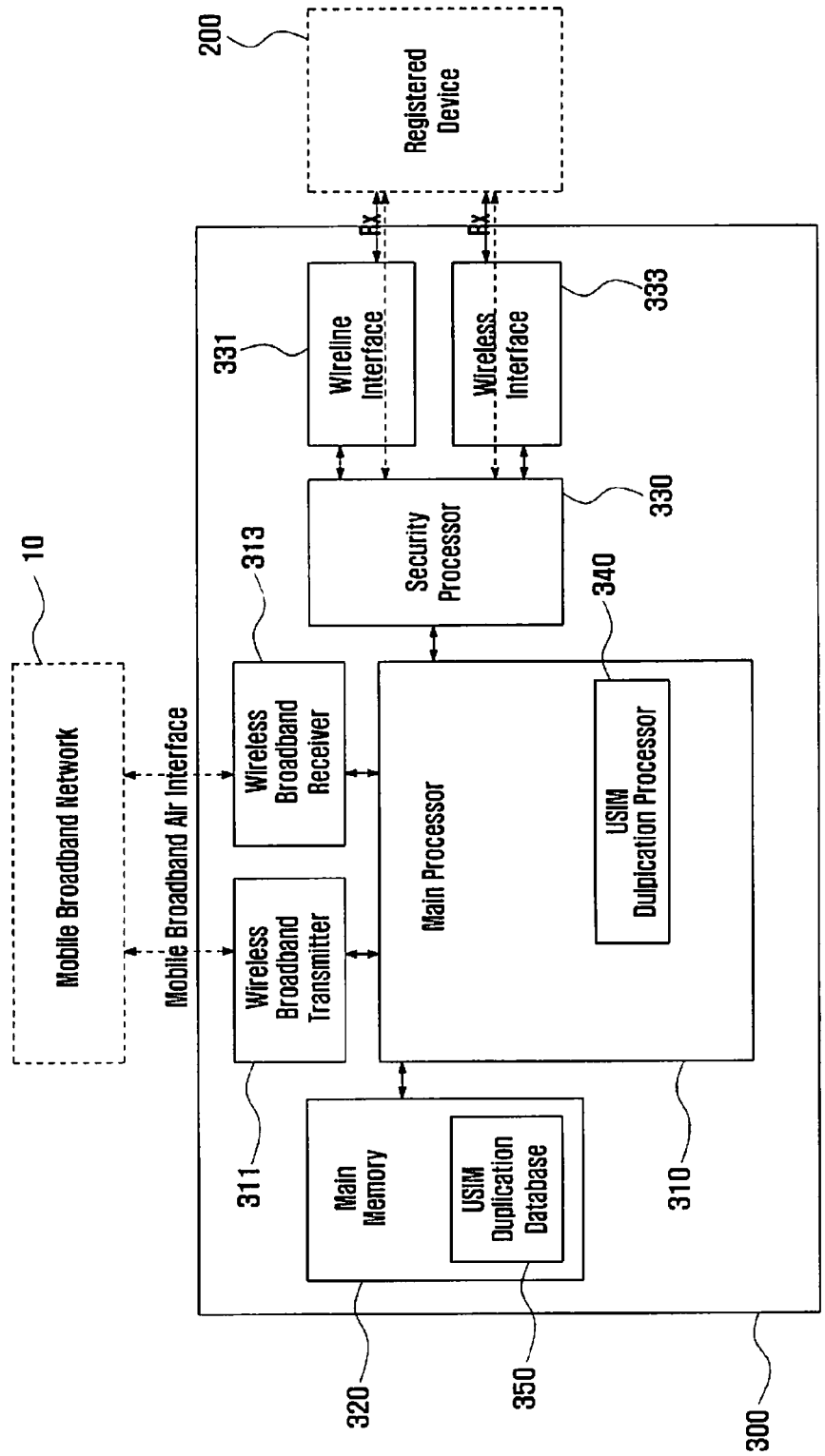
Figure 11:
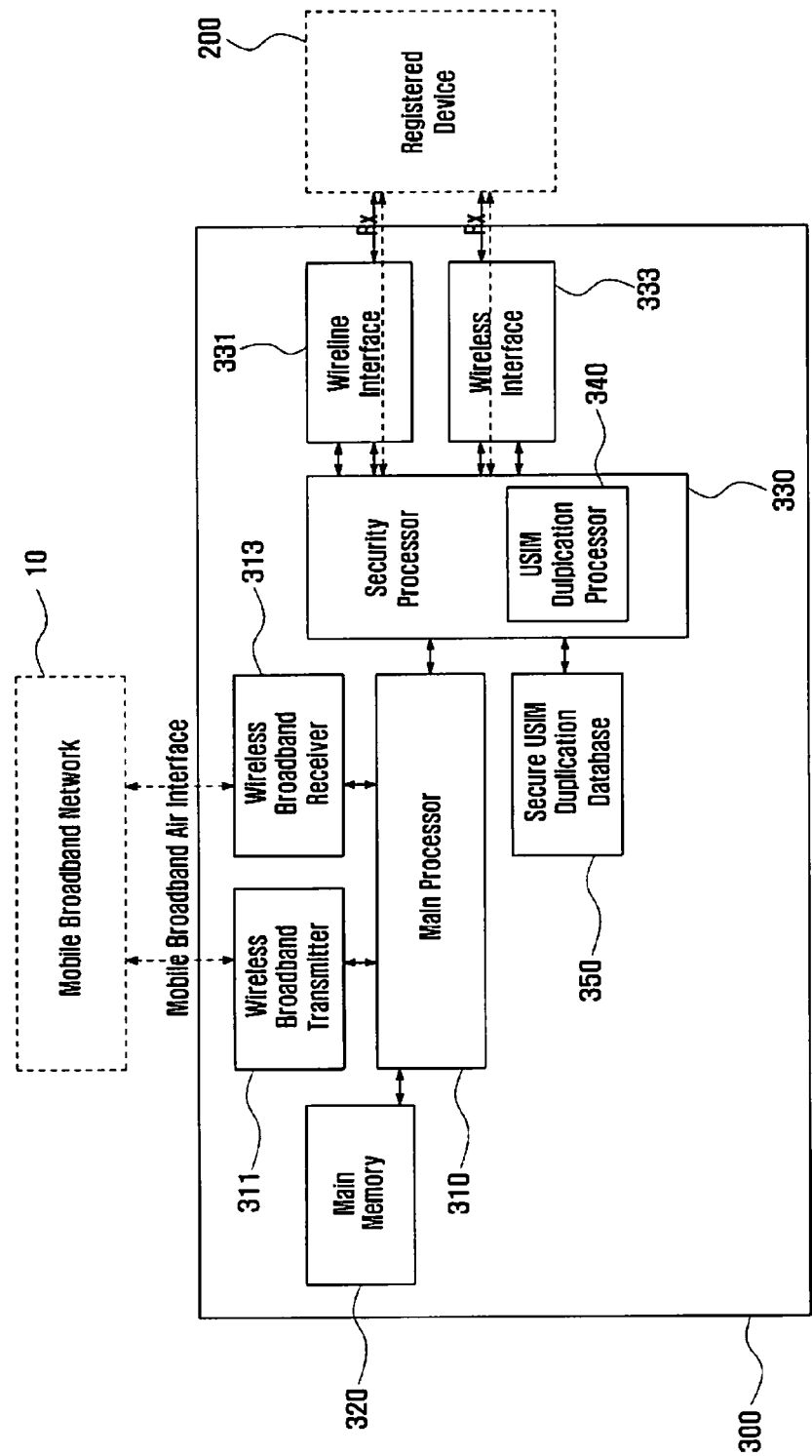

FIGS. 9 to 11 illustrate a configurations of an unregistered device according to an embodiment of the present invention.

Referring to FIG. 9, an unregistered device 300 includes a main processor 310, a wireless broadband transmitter 311, a wireless broadband receiver 313, and a main memory 320. Such an arrangement provides communication functions connected with a wireless broadband network 10. In particular, the unregistered device 300 does not have a structural element connected to the USIM module 100 in comparison with the registered device 200.

The unregistered device 300 further includes a security processor 330, wired and wireless interfaces 331 and 333, a USIM duplication processor 340, and a USIM duplication database 350.

The security processor 230 is for an Rx interface in which security is ensured. The wired and wireless interfaces 231 and 232 provide an interface applying security in connection with the unregistered device 300.

The USIM duplication processor 340 processes an Rx interface message for requesting and obtaining authentication information from the registered device 200.

The USIM duplication database 350 is for managing information of the unregistered device 300 matching with the registered device 300. Namely, the USIM duplication database 350 includes information of the unregistered devices 300 to which the registered device 200 provides the authentication information.

The following Table 2 describes information stored by the USIM duplication database 350 of the unregistered device 300 according to an embodiment of the present invention.

TABLE 2

| USIM Information | PermittedServiceOption | PermittedServiceAllowed | PermittedServicePeriod |
|---|---|---|---|
| Secured USIM Information | (0) data only | 2009.07.10_18:13:25 | 60 minutes |

Table 2 is a database that shares authentication information with respect to the unregistered device 300 managed by the registered device 200.

As listed in Table 2, the database includes USIM information, Permitted Option (PermittedServiceOption), Permitted time (PermittedServiceAllowed), and Permitted Period (PermittedServicePeriod) fields.

The USIM information (authentication information) field encrypts and maintains temporarily shared authentication information.

A permission option field indicates services that the registered terminal 200 permits the unregistered terminal 300 to use, including permitting general data services, permitting circuit voices therewith, permitting IMS services therewith, and a combination thereof. Further, a permitted time field indicates a sharing starting time, and a permitted period field indicates a sharing permitted period. FIG. 9 is a model in which a logical processor and a storage medium are respectively implemented by an independent structure. As shown in FIG. 10, a main processor 210 includes functions of the USIM duplication processor 340 according to the implementation. It is possible to store the USIM duplication database 350 in a main memory 320.

As shown in FIG. 11, the USIM duplication processor 330 may be included in the security processor 330 to emphasize security elements, and the USIM duplication database 350 may be implemented in a secure memory so that only the security processor 330 accesses the USIM duplication database 350.

Figure 12:
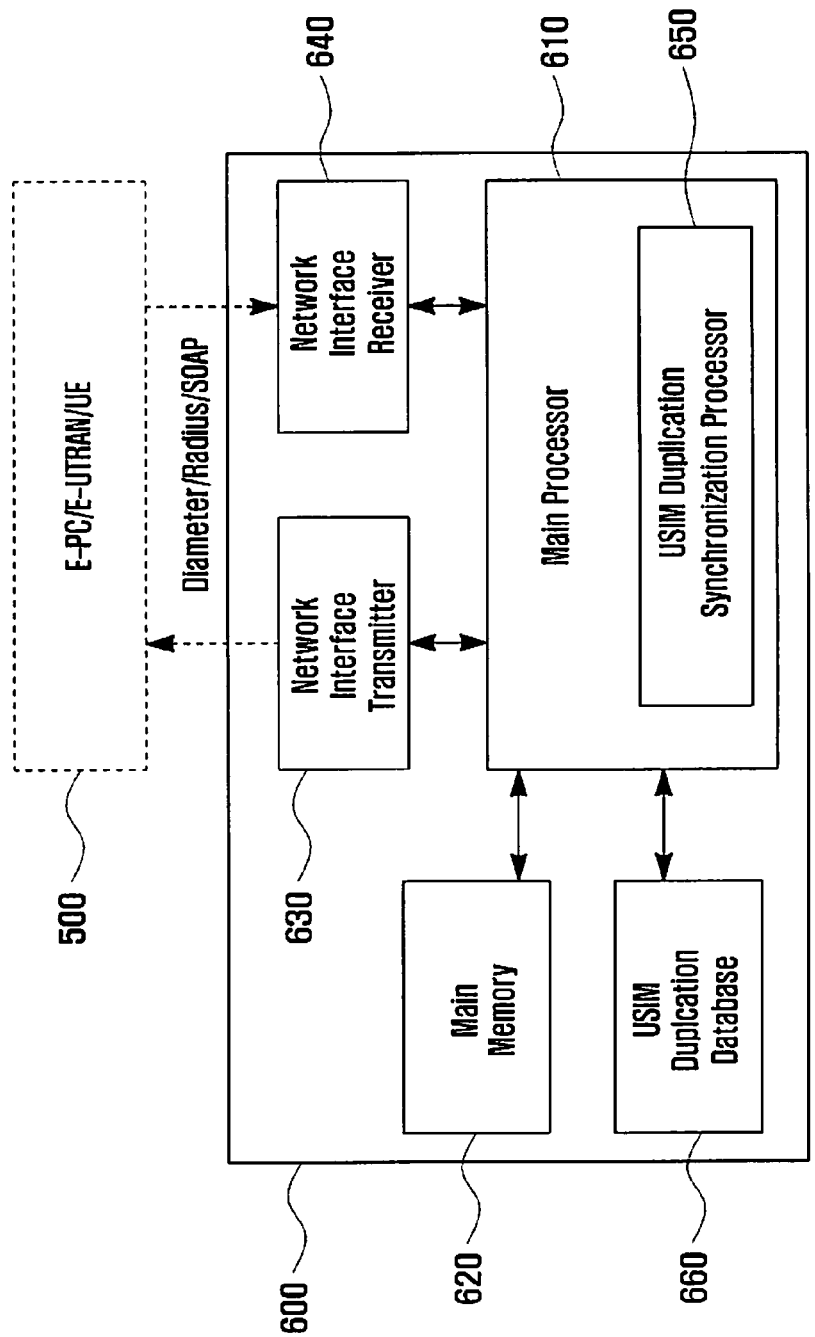
FIG. 12 illustrates a configuration of an authentication/ registration management server according to an embodiment of the present invention.

FIG. 12 illustrates a configuration of an authentication/registration management server according to an embodiment of the present invention.

Referring to FIG. 12, the authentication/registration management server includes a main processor 610, a main memory 620, a network interface transmitter 630, a network interface receiver 640, a USIM duplication processor 650, and a USIM duplication database 660.

Fundamentally, the main processor 610 and the main memory 620 process fundamental functions such as authentication, registration, and billing, and stores data created according to the processing.

Further, the network interface transmitter 630 and the network interface receiver 640 communicate with the core network 500.

The USIM duplication processor 650 processes information for managing the unregistered device to which the registered device 200 provides the authentication information.

Further, the USIM duplication database 660 stores information processed from the USIM duplication processor 650. The following Table 3 describes information stored in the USIM duplication database 660.

A permission option field indicates services that the registered device 200 permits the unregistered device 300 to use, including permitting general data services, permitting circuit voices therewith, permitting IMS services therewith, and a combination thereof. Further, a permitted time field indicates a sharing starting time, and a permitted period field indicates a sharing permitted period.

In summary, the USIM duplication database 660 stores a list of plural unregistered devices 300 sharing authentication information of a registered device with the registered device 200.

Such a list has a structure that maps and stores device IDS of the plural unregistered devices to a subscriber ID of the registered device 200.

Accordingly, when the unregistered device 300 requests authentication and registration using authentication information sharing with the registered device 200 and a device ID of the unregistered device 300, the authentication/registration management server 600 permits the authentication and registration request with reference to the USIM duplication database 660.

Namely, the authentication/registration management server 600 searches a subscriber ID mapped to the device ID, and checks whether the searched subscriber ID matches with the authentication information from the unregistered device 300. When the searched subscriber ID matches with the authentication information from the unregistered device 300, the authentication/registration management server 600 permits the authentication and registration.

Since a permitted option filed of the USIM duplication database 660 indicates a service that the registered device 200 permits the unregistered device 300 to use, the authentication/registration management server 600 may limit a service range of the unregistered device 300 according to a service range with reference to the permission option field.

TABLE 3

| Subscription ID | SourceID | PermittedServiceOption | PermittedServiceAllowed | PermittedServicePeriod |
|---|---|---|---|---|
| Subscription #1 | IMEI_1 | (0) data only | 2009.07.10_18:13:25 | 60 minutes |
| Subscription #1 | IMEI_2 | (1) data + circuit voice | 2009.07.10_12:24:20 | 60 minutes |
| ... | | | | |
| Subscription #1 | IMEI_n | (0) data only | 2009.07.10_17:00:05 | 360 minutes |
| Subscription #2 | IMEI_m | (0) data only | 2009.07.10_18:13:25 | 60 minutes |

Referring to Table 3, the information stored in the USIM duplication database 660 includes Subscription ID, Source ID (SourceID), Permitted Option (PermittedServiceOption), Permitted time (PermittedServiceAllowed), and Permitted Period (PermittedServicePeriod) fields.

The USIM information (authentication information) field is for encrypting and maintaining temporarily shared authentication information.

The subscription ID is a subscriber ID of a registered device 200 receiving the authentication information, and the source ID is a device ID of the unregistered device 300. As described above, the subscriber ID and a plurality of device IDs are mapped to each other to be stored. When the unregistered device 300 receives authentication information from the registered device 200, it authenticates and registers in the wireless broadband communication network using the authentication information (subscriber ID) of the registered device 200. Accordingly, the authentication/registration management server 600 permits the unregistered device for authentication and registration using the foregoing subscriber ID and a device ID mapped thereto.

A USIM duplication processor 650 in the authentication/registration management server 600 for such white-list management may be supported in a main processor or may operate as a separate device.

Tables 4 to 7 describe messages for sharing authentication information between the registered terminal and the unregistered terminal.

TABLE 4

| Field | Size (Octet) | Value |
|---|---|---|
| MessageType | 1 | type of this message |
| TransactionNumber | 1 | transaction number increased by one per transaction |
| SourceIDType | 1 | type of Source ID (e.g. IMEI(0), MEID(1)) |
| SourceID | 2 | IMEI/MEID of source unauthenticated machine |

TABLE 4-continued

| Field | Size (Octet) | Value |
|---|---|---|
| RequestedServiceOption | 1 | data only (0), data + circuit voice (1), data + IMS voice (2), others are reserved |
| RequestedServicePeriod | 2 | temporal service in minutes, permanent(0) |

TABLE 5

| Field | Size (Octet) | Value |
|---|---|---|
| MessageType | 1 | type of this message |
| TransactionNumber | 1 | transaction number increased by one per transaction |
| SourceIDType | 1 | type of Source ID (e.g. IMEI(0), MEID(1)) |
| SourceID | 2 | IMEI/MEID of source unauthenticated machine |
| RequestedServiceOption | 1 | data only (0), data + circuit voice (1), data + IMS voice (2), others are reserved |
| RequestedServicePeriod | 2 | temporal service in minutes, permanent(0) |

TABLE 6

| Field | Size (Octet) | Value |
|---|---|---|
| MessageType | 1 | type of this message |
| TransactionNumber | 1 | received transaction number |
| SourceIDType | 1 | type of Source ID (e.g. IMEI(0), MEID(1)) |
| SourceID | 2 | IMEI/MEID of source unauthenticated machine |
| PermittedServiceOption | 1 | data only (0), data + circuit voice (1), data + IMS voice (2), others are reserved |
| PermittedServicePeriod | 2 | temporal service in minutes, permanent(0) |
| CrystalLength | 2 | length of CrystalField in octets |
| CrystalField | Variable | duplicated authentication information (e.g. USIM) |
| Result | 1 | transaction result code (e.g. success(0) or fail(1)) |
| Reason | 1 | reason for failed transaction (values are TBD) |

TABLE 7

| Field | Size (Octet) | Value |
|---|---|---|
| MessageType | 1 | type of this message |
| TransactionNumber | 1 | received transaction number |
| SourceIDType | 1 | type of Source ID (e.g. IMEI(0), MEID(1)) |
| SourceID | 2 | IMEI/MEID of source unauthenticated machine |
| PermittedServiceOption | 1 | data only (0), data + circuit voice (1), data + IMS voice (2), others are reserved |
| PermittedServicePeriod | 2 | temporal service in minutes, permanent(0) |

TABLE 7-continued

| Field | Size (Octet) | Value |
|---|---|---|
| CrystalLength | 2 | length of CrystalField in octets |
| CrystalField | Variable | duplicated authentication information (e.g. USIM) |
| Result | 1 | transaction result code (e.g. success(0) or fail(1)) |
| Reason | 1 | reason for failed transaction (values are TBD) |

Table 4 illustrates a USIM Duplication Request (USIM_Duplication_Request) message, and Table 5 illustrates a USIM Duplication Indication (USIM_Duplication_Indication) message.

Table 6 illustrates a USIM Duplication Response (USIM_Duplication_Response) message, and Table 7 illustrates a USIM Duplication Confirm(USIM_Duplication_Confirm) message.

Included in the provided messages are a Message Type (MessageType) field indicating a type of each message and a Transaction Number (TransactionNumber) independently indicating execution of each message as examples of the same field.

A unique number code by corresponding messages is given in an implementing time as a Message Type (MessageType). The Transaction Number (TransactionNumber) is a unique number for when respective images are created and transmitted. The Transaction Number (TransactionNumber) can be determined in such a manner that the number of a first message is 0, and the number is increased by 1 each time a next message is transmitted or may have a pattern allotting a random number.

A USIM Duplication Request (USIM_Duplication_Request) message of Table 4 and a USIM Duplication Indication (USIM_Duplication_Indication) message of Table 5 are equally defined.

A Source ID (SourceID) field for transmitting a message is included in a device ID of the unregistered device 300. IMEI of 3GPP or MEID of 3GPP2 is used according to a wireless broadband communication technology, to determine that which uses a standard method in a Source ID type (SourceIDType) field.

Requested service type and time information are included in Request Service Option (RequestedServiceOption) and Request Service Period (RequestedServicePeriod) fields to be sent.

A USIM Duplication Response (USIM_Duplication_Response) message of Table 6 and a USIM Duplication Confirm (USIM_Duplication_Confirm) message of Table 7 are equally defined. A Source ID (SourceID) as an ID of the unregistered device 300 sending a message and a Source ID Type (SourceIDType) field are the same as those of the foregoing USIM Duplication Request (USIM_Duplication_Request) message and USIM Duplication Indication (USIM_Duplication_Indication).

Further, permitted service type and time are described in Permitted Service Option (PermittedServiceOption) and Permitted Service Period (PermittedServicePeriod) fields, respectively. Authentication information is sent through a Crystal Field (CrystalField). The authentication information included in the crystal field may contain all information stored in the USIM module 100.

Only a USIM Mandatory parameter among information stored in the USIM module 100 may be duplicated and sent as the authentication information sent through the crystal field.

The USIM mandatory parameter may become security related information, PLMN related information, and USIM management related information.

For example, in WCDMA, the USIM Mandatory parameter includes EFIMSI (IMSI), EFKeys (Ciphering and Integrity Keys), EFKeysPS (Ciphering and Integrity Keys for Packet Switched domain), EFHPPLMN (Higher Priority PLMN search period), EFUST (USIM Service Table), EFACC (Access Control Class), EFFPLMN (Forbidden PLMNs), EFSTART-HFN (Initialisation values for Hyperframe number), EFTHRESHOLD (Maximum value of START), and EFNETPAR (Network Parameters).

Since sent authentication information may differ in the size according to a standard thereof, the size of corresponding information is stored in a Crystal Length (CrystalLength) field.

As illustrated above, the authentication information may become all information stored in the USIM module 100, or a USIM Mandatory parameter being a part thereof.

In particular, the authentication information may further include a field designating necessary parameters in consideration of a case duplicating only the parameters selectively necessary in the unregistered device 300.

For example, a field selectively requesting only a USIM Mandatory parameter among information stored in the USIM module 10 can be added to USIM Duplication Request (USIM_Duplication_Request) and USIM Duplication Indication (USIM_Duplication_Indication) messages.

Accordingly, only the requested parameter may be included in a crystal field of USIM Duplication Response (USIM_Duplication_Response) and USIM Duplication Confirm (USIM_Duplication_Confirm) messages to be transmitted.

In addition, there are a result field describing presence of success and a reason field describing a reason of failure.

The following is a description of messages for preventing illegal authentication information from being shared through synchronization and white-list management between the registered device 200 and the authentication/registration management server 300.

Figure 13:
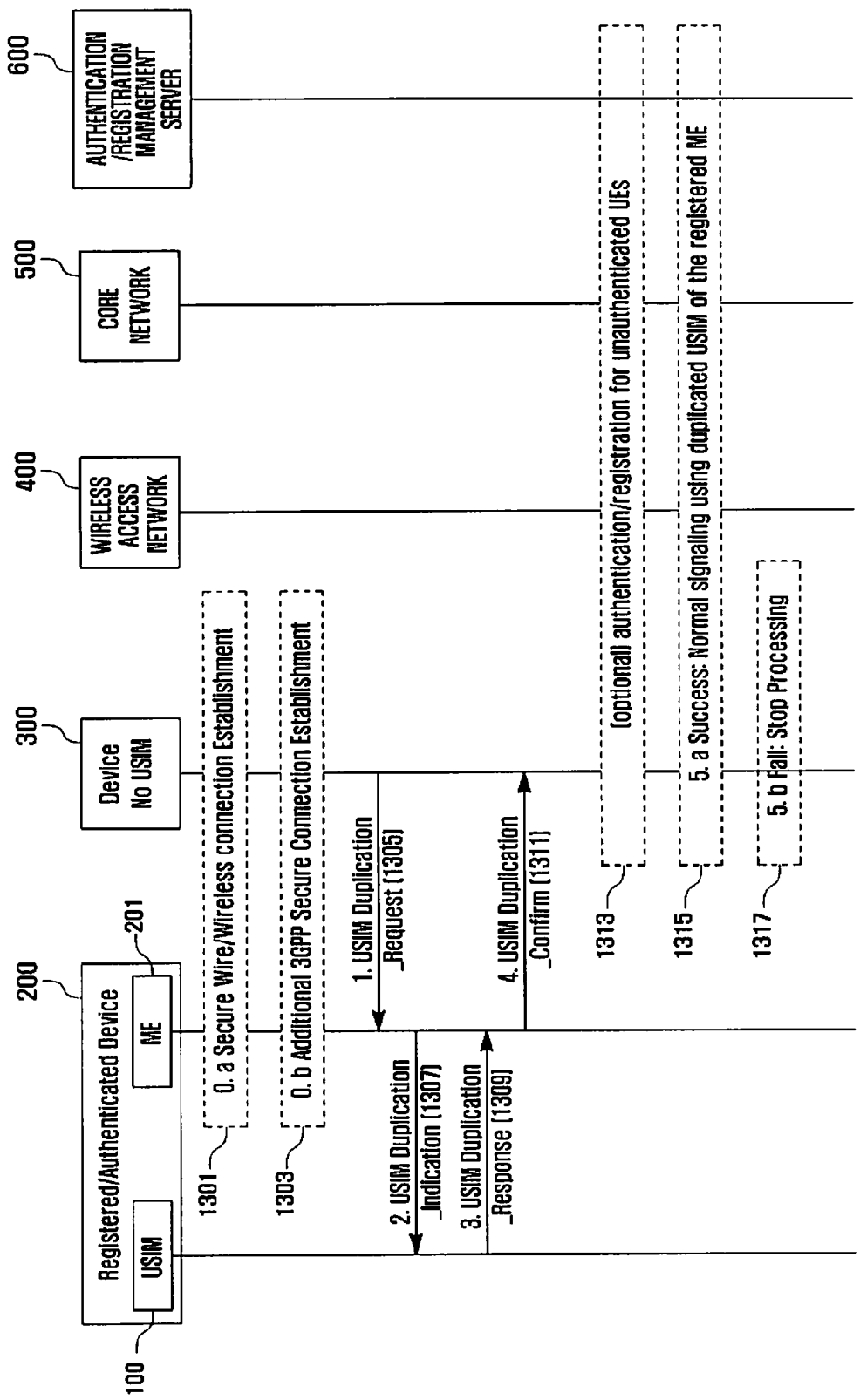
FIG. 13 illustrates a method for sharing authentication information between a registered terminal and an unregistered terminal according to an embodiment of the present invention.

FIG. 13 illustrates a method for sharing authentication information between a registered device and an unregistered device according to an embodiment of the present invention.

Referring to FIG. 13, an unregistered device 300 desiring communication performs wired or wireless connected with a registered device 200 (1301). Here, access is achieved using Bluetooth®, wireless LAN and a wired cable. Such a procedure is for performing mutual authentication and encryption.

An unregistered device 300 may further perform encrypted connection setting of a wireless broadband communication technology with the registered device 200 (1303). This uses connection technology through encrypted 2 layer tunnel or IPsec in the case of 3GPP.

As illustrated in steps 1301 and 1303, when security ensured connection setting is achieved between the unregistered device 300 and the registered device 200, the unregistered device 300 transmits a USIM Duplication Request (USIM_Duplication_Request) message to the registered device 200 to request a temporary sharing of the USIM information (authentication information) listed in the Table 4 (1305).

When the registered device 200 receives the USIM Duplication Request (USIM_Duplication_Request) message, it transmits a USIM Duplication Indication (USIM_Duplication_Indication) as illustrated in Table 5 to a USIM module (USIM/UICC) 100 to inform a request from the unregistered device 300 (1307).

The USIM module (USIM/UICC) 100 transmits a USIM Duplication Response (USIM_Duplication_Response) message accepting or rejecting a temporary sharing of held authentication information as illustrated in Table 6 to the registered device 200 (1309).

Accordingly, the registered device 200 sends a USIM Duplication Confirm (USIM_Duplication_Confirm) message as illustrated in Table 7 to the unregistered device 300 (1311). The USIM Duplication Confirm (USIM_Duplication_Confirm) message has the same information as that of the USIM Duplication Response (USIM_Duplication_Response) message.

In addition to the foregoing USIM information sharing procedure, a procedure authenticating and registering in the wireless broadband communication network 10 is performed (1313). The unregistered device 300 performs authentication and registration procedures using the authentication information provided from the registered device 200 and a device ID mapped to a subscriber ID of the registered device 200.

An authentication/registration management server 600 of the wireless broadband communication network 10 stores a list of plural unregistered devices 300 sharing authentication information of the registered device 200 and the unregistered device 300 in the USIM duplication database 660. The list includes a structure mapping and storing a subscriber ID of the registered device 200 and respective device IDs of the plural unregistered devices 300.

Accordingly, when the unregistered device 300 requests authentication and registration using the authentication information shared with the registered device 200 at step 1313 and a device ID of the unregistered device 300, the authentication/registration management server 600 determines permission of the authentication and registration request with reference to the USIM duplication database 660. Namely, the authentication/registration management server 600 searches a subscriber ID mapped to the device ID and determines whether the searched subscriber ID matches with authentication information of the unregistered device.

When the searched subscriber ID matches with authentication information of the unregistered device, the authentication/registration management server 600 may permit the authentication and registration.

According to the foregoing procedures, the unregistered device 300 successfully sharing the authentication information with the registered device 200 accesses a next communication service with corresponding authentication information (1315).

When the unregistered device 300 fails to share authentication information, the process is terminated as it cannot access the wireless broadband communication network 10 (1317).

Referring to FIG. 13, in order to remove problems occurring when the registered device 200 and the unregistered device 300 exchange information, the authentication/registration management server 600 of a network receives information of the unregistered devices 300 mapped to the registered device 200 for managing the unregistered devices sharing temporary authentication information from the registered device 200. A procedure for synchronizing USIM information between the registered device and the authentication/registration management server will be described.

The following Tables 8 to 11 describe messages exchanged between the registered device 200 and the authentication/registration management server 300.

TABLE 8

| Field | Size (Octet) | Value |
|---|---|---|
| MessageType | 1 | type of this message |
| TransactionNumber | 1 | transaction number increased by one per transaction |
| Reason | 1 | synchronization (0), realtime confirmation (1), others are reserved |

TABLE 9

| Field | Size (Octet) | Value |
|---|---|---|
| MessageType | 1 | type of this message |
| TransactionNumber | 1 | transaction number increased by one per transaction |
| Reason | 1 | synchronization (0), realtime confirmation (1), others are reserved |

TABLE 10

| Field | Size (Octet) | Value |
|---|---|---|
| MessageType | 1 | type of this message |
| TransactionNumber | 1 | transaction number increased by one per transaction |
| Reason | 1 | synchronization (0), realtime confirmation (1), others are reserved |

| Record Field | Size (Octet) | Record Value |
|---|---|---|
| SourceID | 2 | IMEI/MEID of source unauthenticated machine |
| PermittedServiceOption | 1 | data only (0), data + circuit voice (1), data + IMS voice (2), others are reserved |
| PermittedServiceAllowed | VAR | duplication permission time (e.g. GPS) |
| PermittedServicePeriod | 2 | temporal service in minutes, permanent(0) |

TABLE 11

| Field | Size (Octet) | Value |
|---|---|---|
| MessageType | 1 | type of this message |
| TransactionNumber | 1 | transaction number increased by one per transaction |
| Reason | 1 | synchronization (0), realtime confirmation (1), others are reserved |

| Record Field | Size (Octet) | Record Value |
|---|---|---|
| SourceID | 2 | IMEI/MEID of source unauthenticated machine |
| PermittedServiceOption | 1 | data only (0), data + circuit voice (1), data + IMS voice (2), others are reserved |
| PermittedServiceAllowed | VAR | duplication permission time (e.g. GPS) |
| PermittedServicePeriod | 2 | temporal service in minutes, permanent(0) |

Table 8 indicates a USIM Duplication List Request (USIM_DuplicatcationList_Request) message, and Table 9 indicates a USIM Duplication List Indication (USIM_DuplicationList_Indication) message. The messages are for requesting information with respect to the unregistered device 300 performing authentication and registration using the authentication information of the registered device 200.

Table 10 indicates a USIM Duplication List Response (USIM_DuplicationList_Response) message, and Table 11 indicates a USIM Duplication List Confirm (USIM_DuplicationList_Confirm) message. The messages provide a list with respect the unregistered devices 300 using authentication information of the registered device 200.

Messages listed in Tables 8 to 11 also includes a Message Type (MessageType) field indicating a type of each message and a Transaction Number (TransactionNumber) field independently indicating execution of each message in the same manner as in the foregoing messages.

A reason field requesting synchronization is included in USIM Duplication List Request (USIM_DuplicatcationList_Request) and USIM Duplication List Indication (USIM_DuplicatiList_Indication) messages.

USIM Duplication List Response (USIM_DuplicationList_Response) and USIM Duplication List Confirm (USIM_DuplicationList_Confirm) messages have a plurality of records, which include information with respect to an unregistered device with which a registered device shares authentication information, and include an authentication sharing information situation with a plurality of unregistered devices.

Figure 14:
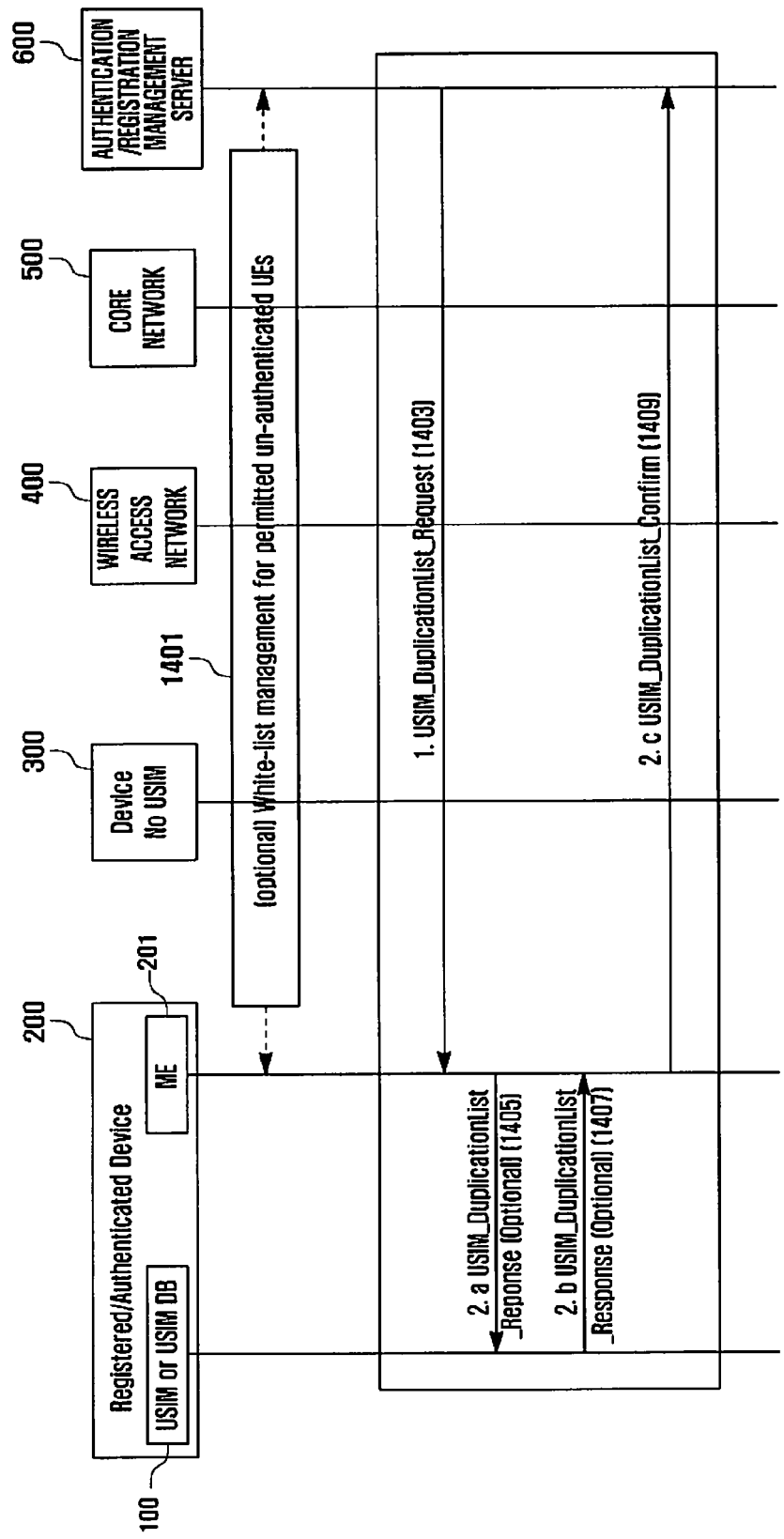
FIG. 14 illustrates a method for synchronizing authentication information between a registered terminal and an authentication/registration management server according to an embodiment of the present invention.

FIG. 14 illustrates a method for a method synchronizing authentication information between a registered device and an authentication/registration management server according to an embodiment of the present invention.

Referring to FIG. 14, in order for the registered device 200 to know with which devices 300 authentication information regarding time and services are shared, the authentication/registration management server 600 of a network transmits a USIM Duplication List Request (USIM_DuplicationList_Request) message to the registered device 200 (1403). When the registered device 200 receives the USIM Duplication List Request (USIM_DuplicationList_Request) message, it sends a USIM Duplication List Indication (USIM_DuplicationList_Indication) message as illustrated in Table 9 to the USIM (USIM/UICC) 100 or the USIM duplication database to inform a corresponding request (1405).

The registered device 200 receives information sharing authentication information of a corresponding registered device 200 from the USIM 100 or the USIM duplication database 250 through the USIM Duplication List Response (USIM_DuplicatList_Response) message (1407). The USIM Duplication List Response (USIM_DuplicatList_Response) message is illustrated in Table 10.

The registered device 200 sends a USIM Duplication List Confirm (USIM_DuplicatList_Confirm) message as illustrated in Table 11 to the authentication/registration management server 600 (1409).

When the authentication/registration management server 600 receives the foregoing messages, it constructs a database as illustrated in Table 3. Accordingly, the authentication/registration management server 600 may check illegal authentication information sharing and illegal authentication information sharing through a corresponding database. As mentioned earlier, the registered device 200 may adjust a service range of the unregistered device 300 that will use sharing authentication information. Permitted Service Option (PermittedServiceOption) fields of Tables 6 and 7 are information for adjusting a service mode.

Respective available service ranges of the registered device 200 and the unregistered device 300 may be limited according to the foregoing information.

FIGS. 15 to 18 illustrate methods for adjusting a service range of a registered device 200 and an unregistered device 300 according to embodiments of the present invention.

It is assumed that the registered device 200 and the unregistered device 300 are in a state sharing the authentication information in FIGS. 15 to 18. In the registered device 200, authentication information is stored in a USIM module 100. In the unregistered device 300, the authentication information is stored in a USIM duplication database 350. In particular, reference numerals 201 and 301 refer to an ME considering only a communication function of a registered device and an unregistered device.

The registered device 200 and the unregistered device 300 adjust a service range according to contents of a Permitted Service Option (PermittedServiceOption) field, respectively.

Figure 15:
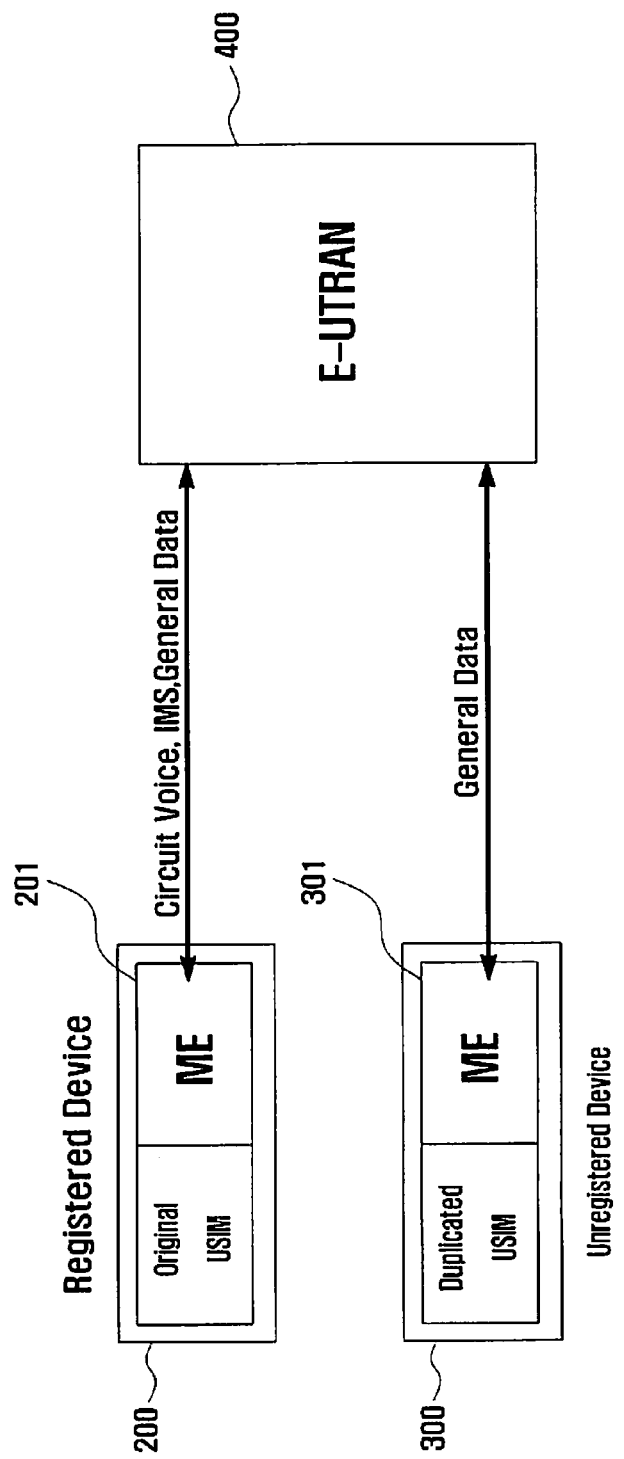
FIGS. 15 to 18 illustrate a method for adjusting a service range of a registered terminal and an unregistered terminal according to an embodiment of the present invention.

In FIG. 15, the unregistered device 300 performs a general data service, and the registered device 200 uses all services.

Figure 16:
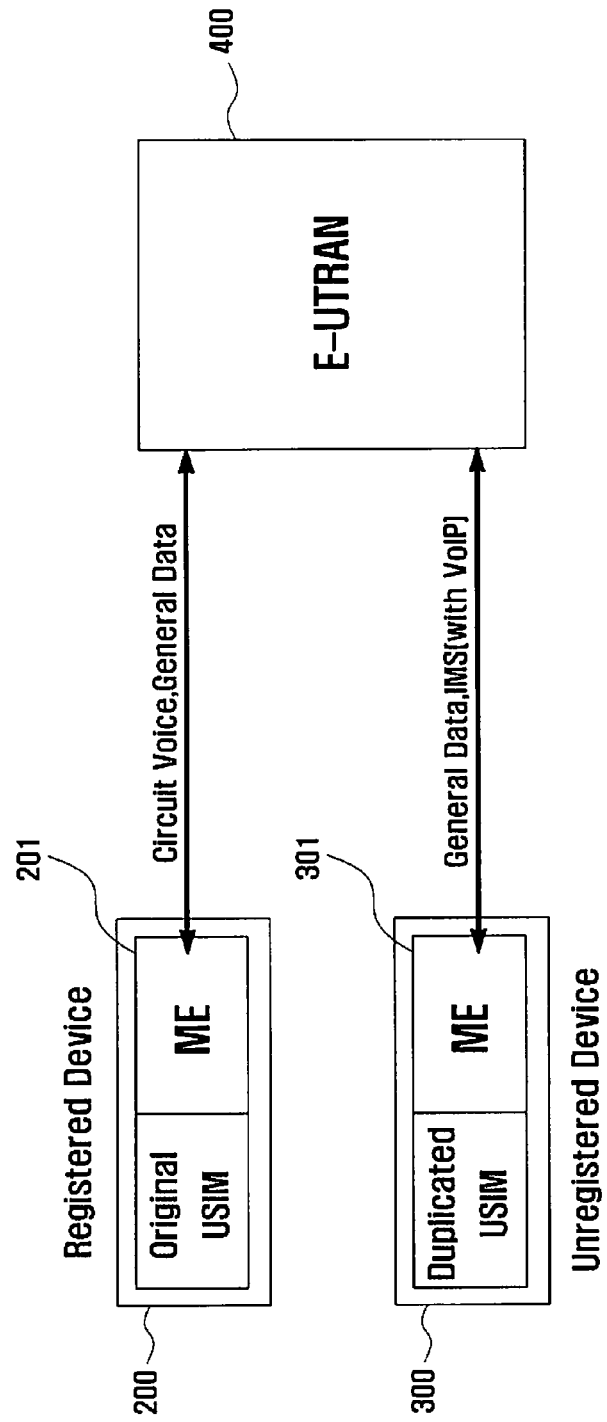

In FIG. 16, the unregistered device 300 can use an IMS service and the registered terminal 200 cannot use the IMS service.

Figure 17:
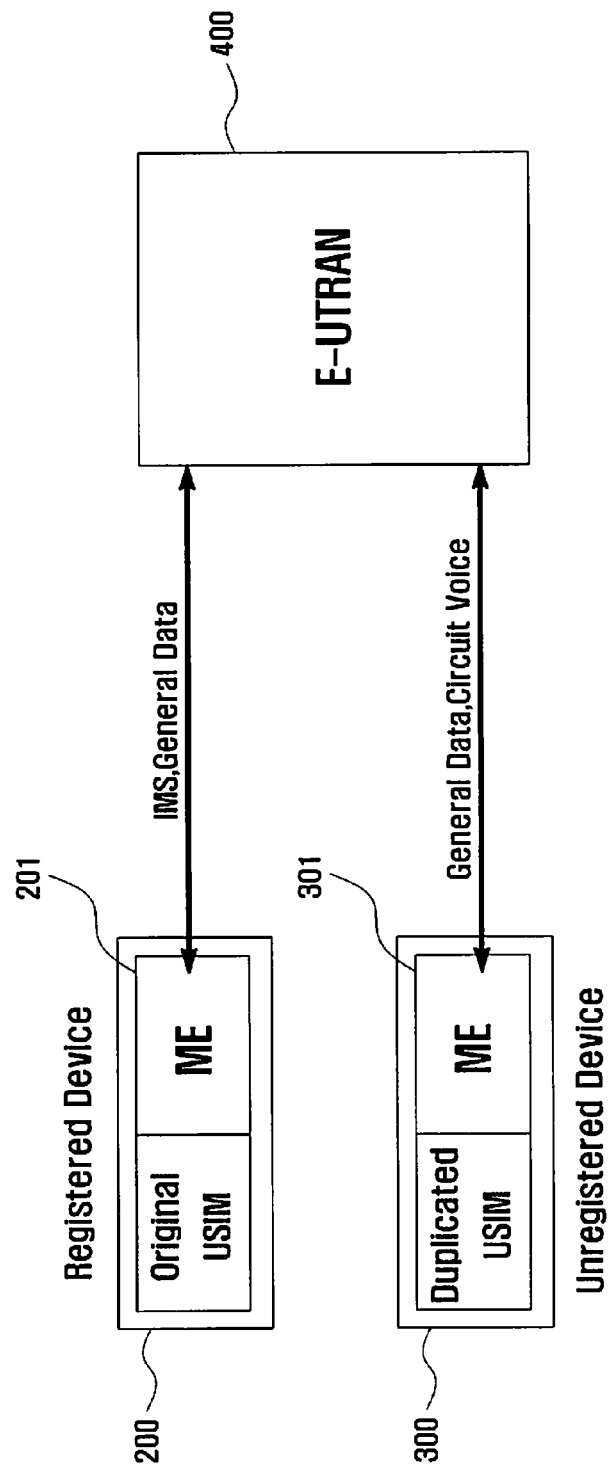

In FIG. 17, a circuit voice service is provided to the unregistered device 300 but is not used by the registered terminal 200.

Figure 18:
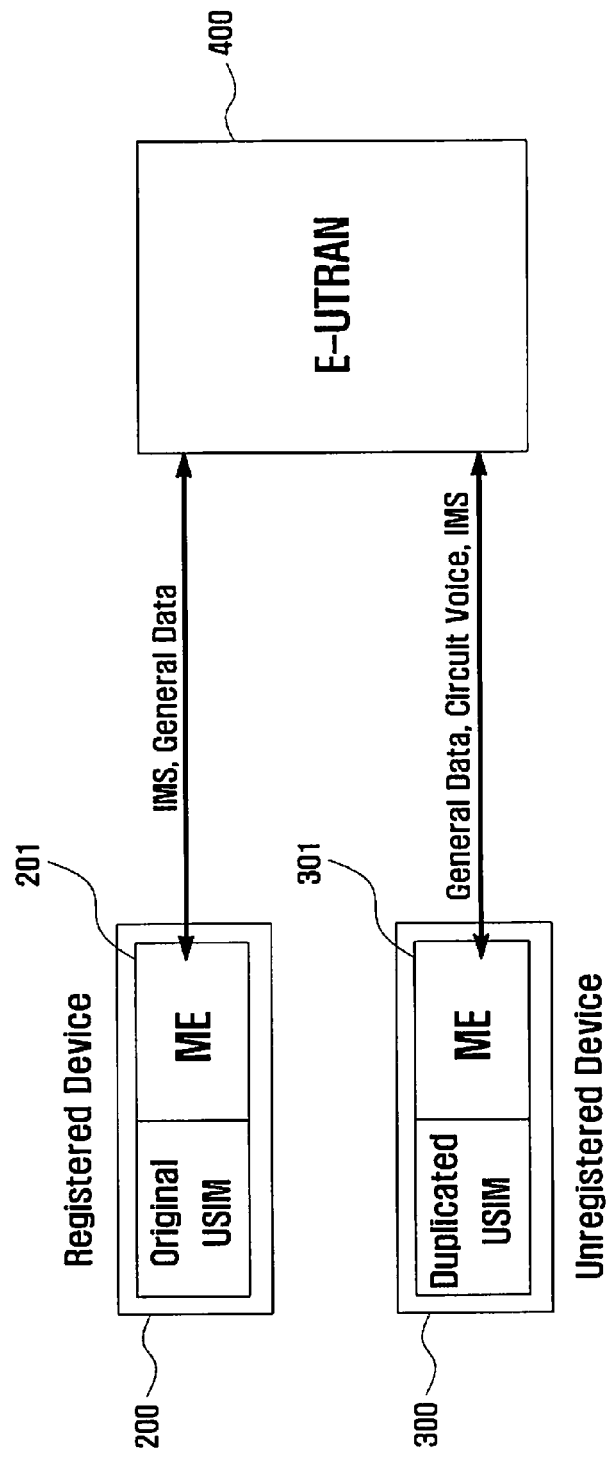

In FIG. 18, all the unregistered devices 300 can use the circuit voice service, the IMS service, and the general data service. The following describes operations of the registered device 200 and the unregistered device 300 illustrated in FIG. 13 in an authentication information sharing method between the registered device 200 and the unregistered device 300. First, an operation of the unregistered device 300 is described.

Figure 19:
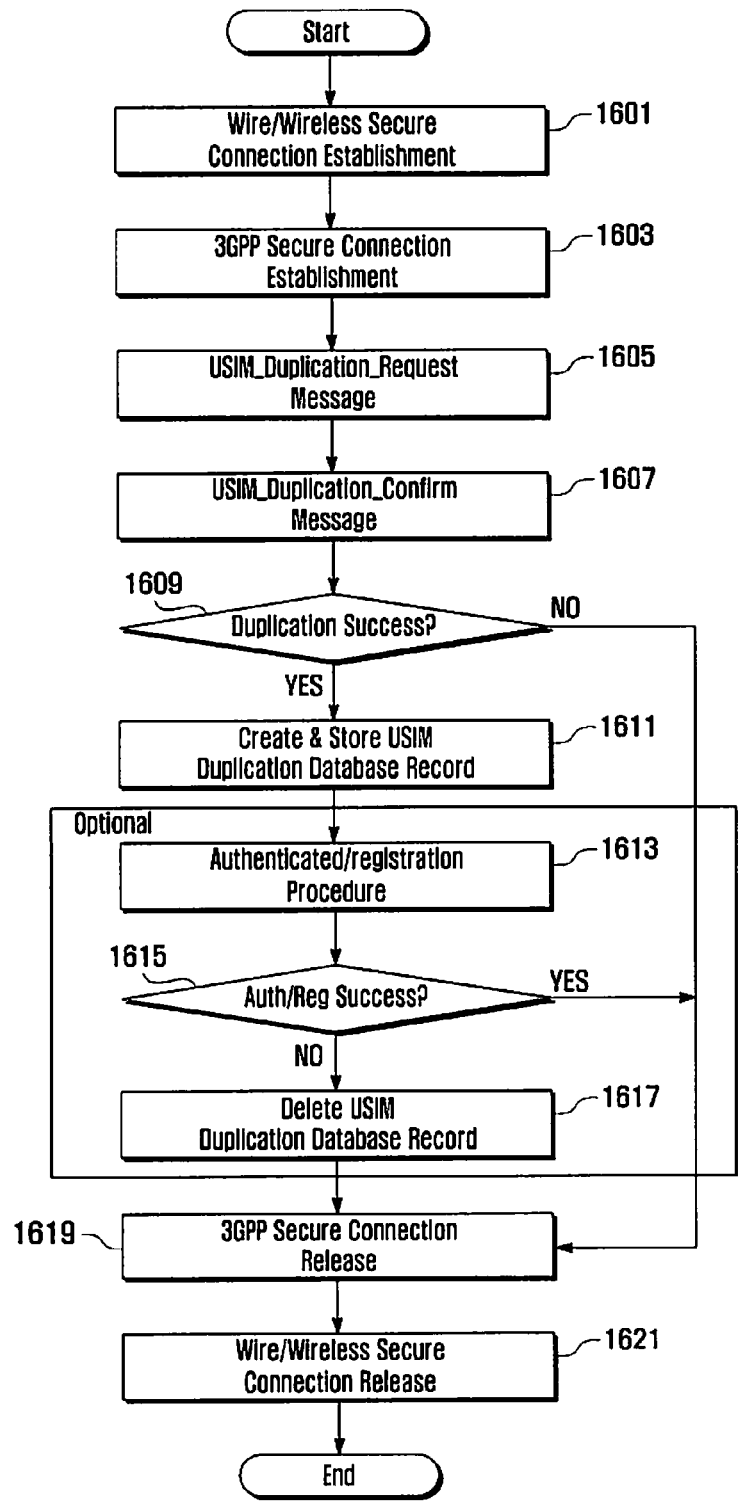
FIG. 19 illustrates an authentication information sharing method of an unregistered terminal according to an embodiment of the present invention.

FIG. 19 illustrates an authentication information sharing method of an unregistered device according to an embodiment of the present invention.

Referring to FIG. 19, an unregistered device 300 desiring to perform communication and application service through a wireless broadband communication network executes wired or wireless connection in which security with a registered device 200 is provided (1601).

The unregistered device 300 further supports a security providing technology provided through wireless broadband communication to ensure stability (1603).

Then, the unregistered device 300 transmits a USIM Duplication Request (USIM_Duplication_Request) message requesting sharing of authentication information to the registered device 200, and waits for a response (1605).

When the unregistered device 300 receives a USIM Duplication Confirm (USIM_Duplication_Confirm) message from the registered device 200 (1607), it determines whether the sharing of authentication information is successful or received through a USIM Duplication Confirm (USIM_Duplication_Confirm) message (1609).

When the sharing of authentication information fails according to the USIM Duplication Confirm (USIM_Duplication_Confirm) message, the unregistered device 300 cancels connection with the registered device 200 (steps 1619 and 1621).

When the sharing of authentication information is successful, the unregistered device 300 stores/manages authentication information shared in its USIM duplication database 350 (1611).

Subsequently, the unregistered device 300 accesses an authentication/registration management server 600 of the wireless broadband communication network 10 to perform authentication and registration procedures (1613).

The authentication and registration procedures are performed using shared authentication information and a device ID mapped to a subscriber ID of a registered device, to determine whether the shared authentication information is valid.

The authentication/registration management server 600 stores a list of the registered device 200 and a list of plural unregistered devices 300 sharing authentication information with the registered device 200. The lists have a structure that maps respective device IDs of the plural unregistered devices to a subscriber ID of the registered device 200 to be stored.

Accordingly, when the unregistered device 300 requests authentication and registration using authentication information sharing with the registered device 200 and a device ID of the unregistered device 300 at step 1613, the authentication/registration management server 600 permits the authentication and registration request with reference to the USIM duplication database 660. Namely, the authentication/registration management server 600 searches a subscriber ID mapped to a device ID to determine whether the searched subscriber ID is mapped to authentication information from an unregistered device. When the searched subscriber ID is mapped to the authentication information from an unregistered device, the authentication/registration management server 600 permits authentication and registration.

Further, since a permission option field of the USIM duplication database 660 is a service that the registered terminal 200 permits the unregistered device 300 to use, the authentication/registration management server 600 can limit a service range of the unregistered device 300 according to a service range with reference to the permission option field.

When the unauthenticated/unregistered device 300 succeeds in authentication and registration (1615), it cancels connection according to a security technology provided from wireless broadband communication (1619), and cancels wired or wireless connection in which security is provided (1621).

When the unauthenticated/unregistered device 300 fails authentication and registration at step 1615, it removes shared authentication information stored in the USIM duplication database 350 (1617), and then cancels connection with the authenticated/registered device 200 (1619 and 1621).

The foregoing procedure of FIG. 19 is performed by the USIM duplication processor 340, and can be supported by the main processor 310 of FIG. 10 and a security processor 330 of FIG. 11. Further, the USIM duplication database 350 can be stored in a main memory 320 in FIGS. 9 and 10, and a memory 350 in FIG. 11 to which security is applied according to the implementation.

Figure 20:
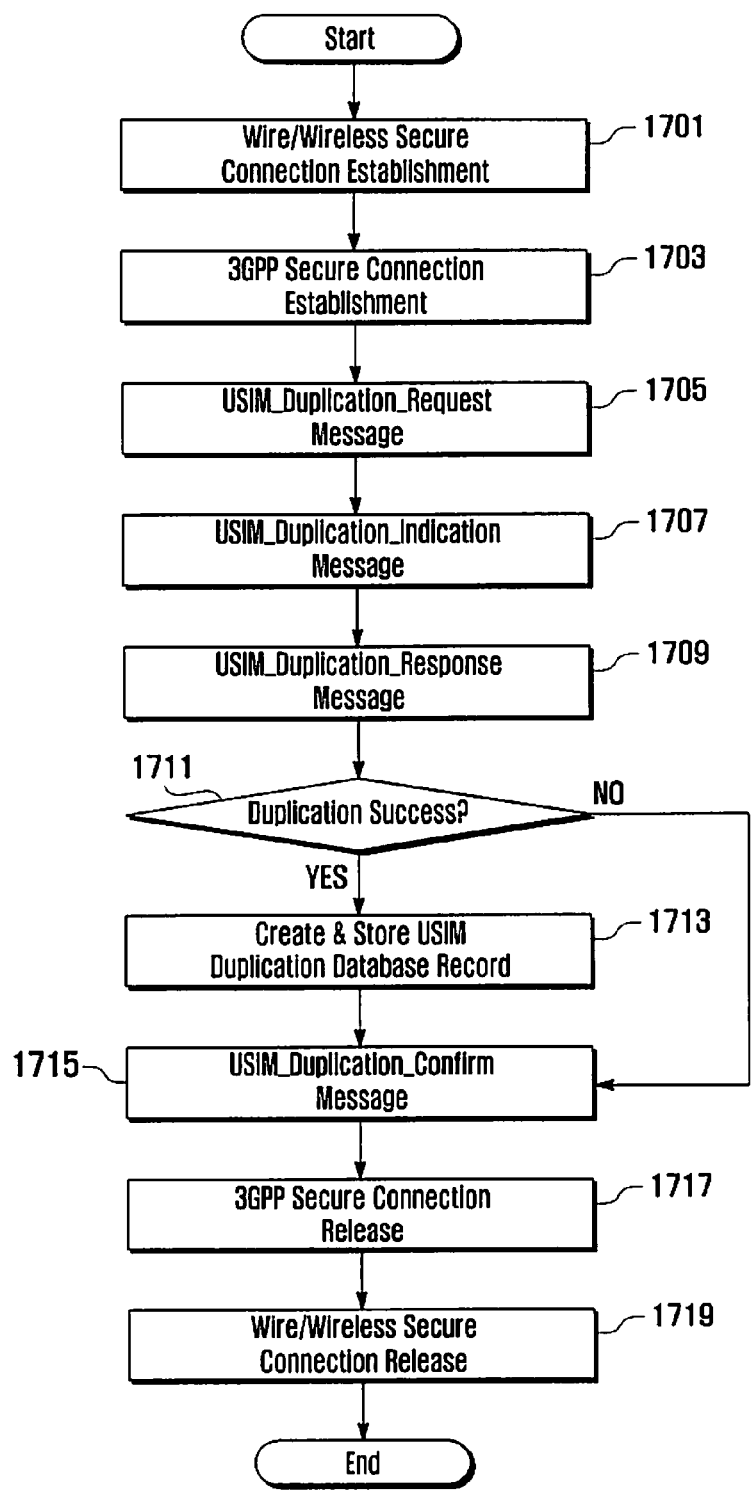
FIG. 20 illustrates an authentication information sharing method of a registered terminal according to an embodiment of the present invention.

FIG. 20 illustrates an authentication information synchronizing method of an authentication/registration management server according to an embodiment of the present invention.

According to a request from the unregistered device 300 desiring to perform wireless broadband communication, the registered device 200 sets wired and wireless connection to which security is provided and security connection of wireless broadband communication with the unregistered device 300 (1701 and 1703).

After setting connection with the unregistered device 300, when the registered device 200 receives a USIM Duplication Request (USIM_Duplication_Request) message from the unregistered device 300 (1705), it directly reads information of the USIM module 100 or transmits a USIM Duplication Indication (USIM_Duplication_Indication) message to the USIM 100 implemented as an independent device to request sharing of authentication information (1707).

When the registered device 200 receives a USIM Duplication Response (USIM_Duplication_Response) message as a response thereof (1709), it determines whether the sharing of authentication information is successful or fails according to the USIM Duplication Response (USIM_Duplication_Response) message (1711).

When the sharing of authentication information fails, the registered device 200 sends a USIM Duplication Cconfirm (USIM_Duplication_Confirm) with a failure code to the unregistered device 300 (1715).

When the sharing of authentication information is successful, the registered device 200 records authentication information sharing with respect to a corresponding unregistered device 300 in its USIM duplication database 250 (1713). The registered device 200 transmits a USIM Duplication Confirm (USIM_Duplication_Confirm) message with a success code to the unregistered device 300.

The registered device 200 then cancels connection with the unregistered device 300 (1717 and 1719). Namely, the registered device 200 cancels connection according a security technology provided from wireless broadband communication (1717), and cancels wired or wireless connection in which security is provided (1719).

The procedure illustrated in FIG. 20 is performed by a USIM duplication processor 240 in FIG. 6, and can be supported in a main processor 210 or a security processor 230 of FIG. 8 according to an implementation manner.

Furthermore, the USIM duplication database 250 can be stored in a main memory 220 in FIGS. 6 and 7, and a memory 250 supporting security in FIG. 8.

The following is a description of an authentication information sharing method according to an embodiment of the present invention. This illustrates a procedure by which an authentication/registration management server 600 obtains information with respect to an unregistered device using a registered device and the unregistered device.

Figure 21:
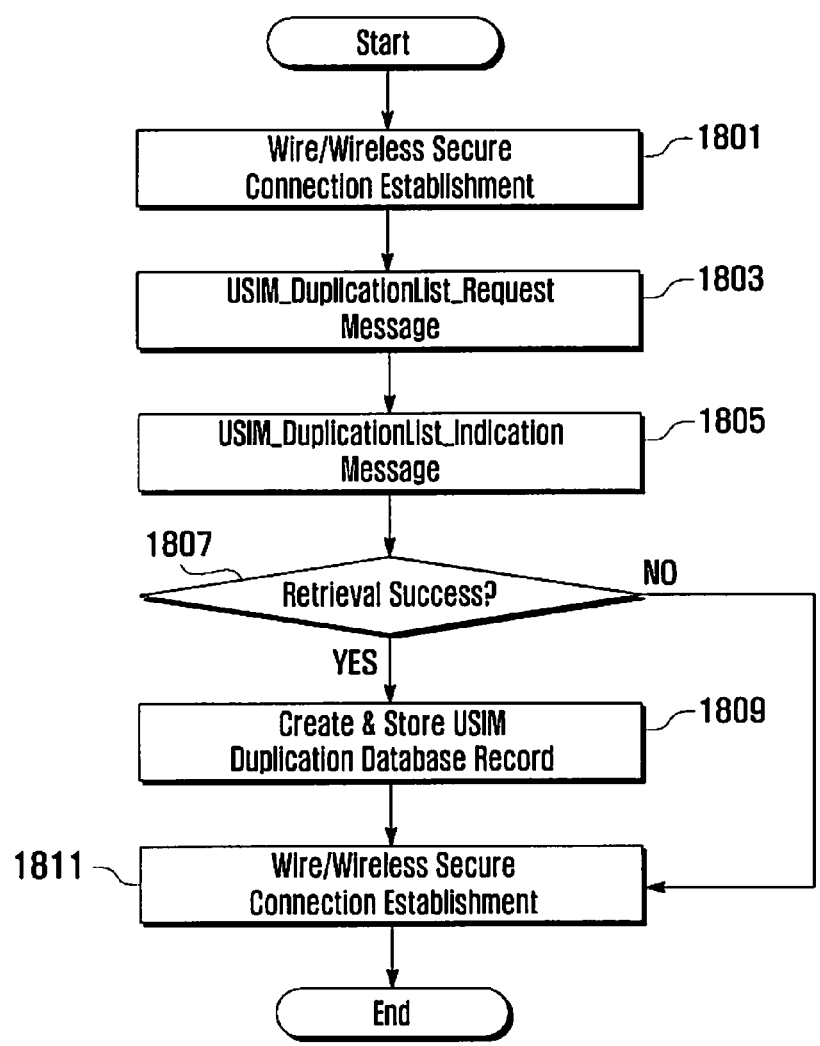
FIG. 21 illustrates an authentication information synchronizing method of an authentication/registration management server according to an embodiment of the present invention.

FIG. 21 illustrates an authentication information synchronizing method of an authentication/registration management server according to an embodiment of the present invention.

This procedure is performed by the USIM duplication processor 650. The authentication/registration management server 600 establishes connection with the registered device 200 through an access network 400 using network interface transmitter and receiver 630 and 640 (1801).

The authentication/registration management server 600 transmits a USIM Duplication List Request (USIM_DuplicationList_Request) message to the registered device 200 to request information with respect to the unregistered device 300 with which the registered device 200 legally shares authentication information (1803).

According to the request message, when the registered device 200 receives a USIM Duplication List Confirm (USIM_DuplicationList_Confirm) message (1805), the authentication/registration management server 600 may determine whether a corresponding procedure is successful or fails according to a USIM Duplication List (USIM_DuplicationList_Confirm) message (1807).

When the procedure is successful, the authentication/registration management server (HSS/EIR) 600 proceeds to step 1809. When the procedure fails, the authentication/registration management server (HSS/EIR) 600 proceeds to step 1811.

When the procedure is successful, the authentication/registration management server 600 creates and stores a database of an authentication information sharing situation with respect to the unregistered device 300 of a corresponding registered device 200 (1809), and terminates connection with the registered device (1811).

When the procedure ails, the authentication/registration management server 600 terminates connection with the registered device 200 without storing the database (1811). The following is an explanation of an authentication information synchronizing method of a registered device 200.

Figure 22:
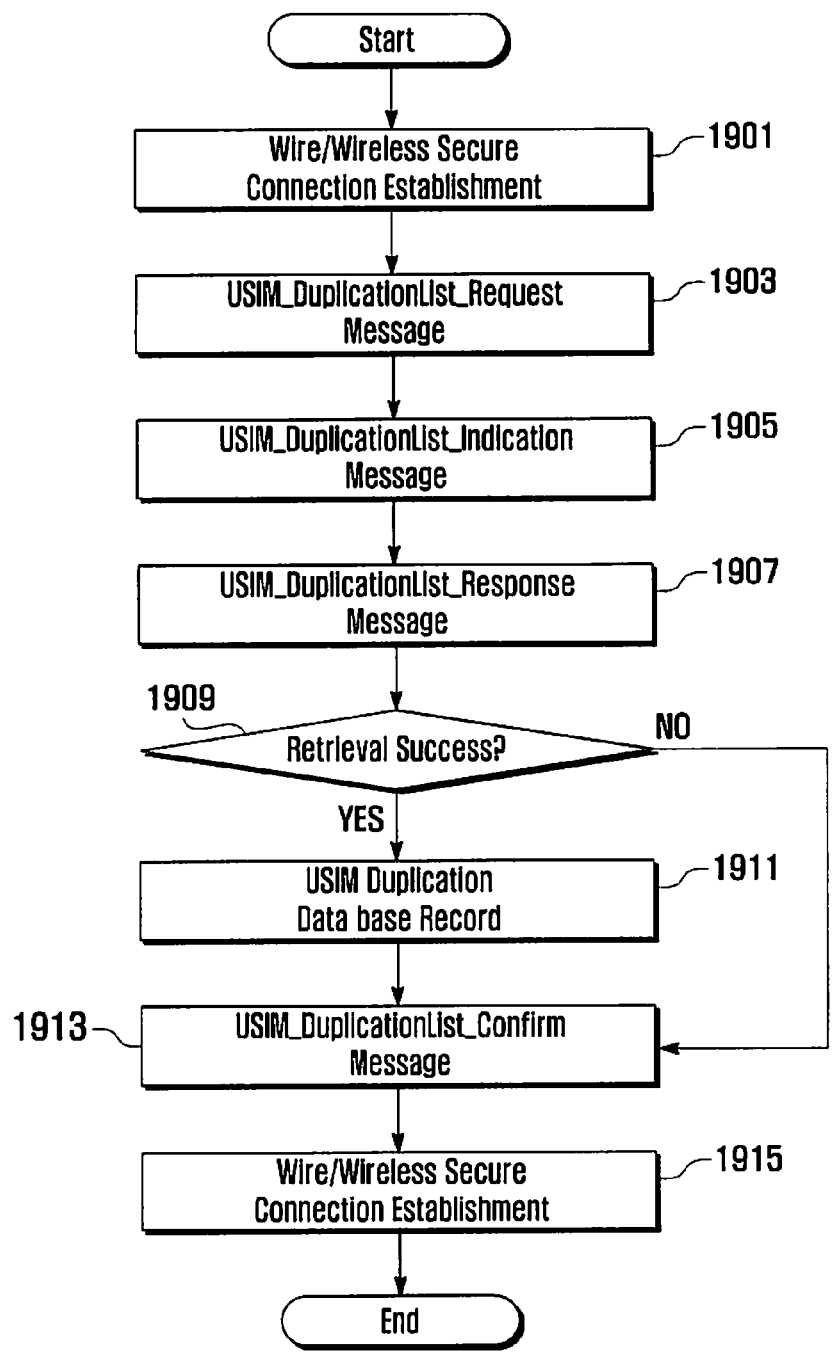
FIG. 22 illustrates an authentication information synchronizing method of a registered terminal according to an embodiment of the present invention.

FIG. 22 illustrates an authentication information synchronizing method of a registered device according to an embodiment of the present invention. This is a procedure performed by a USIM white list processor 260.

Referring to FIG. 22, a registered device 200 establishes connection with an authentication/registration management server 600 (1901).

When the registered device 200 receives a USIM Duplication List Request (USIM_DuplicationList_Request) message from an authentication/registration management server 600 (1903), it directly reads information with respect to an unregistered device 300 illegally sharing authentication information or sends the information to a USIM module 100 as a separately independent device (1905).

When the registered device 200 receives a USIM Duplication List Response (USIM_DuplicationList_Response) message from a USIM 100 (1907), it determines whether a corresponding procedure is successful or fails according to a USIM Duplication List Response message (1909).

When the corresponding procedure fails, the registered device 200 ends step 1913 and then transmits a USIM Duplication Confirm (USIM_DuplicationList_Confirm) message with failure information.

When the corresponding procedure is successful, the registered device 200 creates and stores a authentication information sharing situation of a corresponding registered device 200 with respect to the unregistered device 300 for management (1911), and transmits a USIM Duplication Confirm (USIM_DuplicationList_Confirm) message with corresponding information (1913).

Then, the registered device 200 terminates connection with the authentication/registration management server 600 (1915).

As described above, in an embodiment of the present invention, the unregistered device 300 such as consumer electronic/embedded terminals having no authentication information, mounted therein, provides a wireless broadband communication function, and temporarily shares authentication information of legally applied communication technology from a registered device such as a portable phone. This uses a temporary communication function of consumer electronic/embedded devices that perform less communication or have difficulty in supporting USIM/UICC as a card type in a configuration of a form factor, and application services.

Namely, a user can access cameras, notebooks, game machines, or MP3 players at only a desired time to pay a corresponding fee by sharing authentication information of an authenticated/registered device. The cameras, notebook computers, game machines, or MP3 players are carried by the user but are turned-off. Further, electronic devices in a vehicle may easily support communication with external devices when a driver enters the vehicle.

In this case, a communication technology and application services are achieved in a broadband terminal which is not authenticated and registered. However, a fee for a use of a corresponding communication technology and application services is achieved in a broadband terminal, namely, the registered device 200 that is authenticated and registered. Through this, user convenience, fee management, convenience of USIM/UICC card management, and an enterpriser is reduction in management fees of the USIM/UICC are all realized. Further, wireless broadband communication of all types of consumer electronic/embedded devices is made simple at home, in a vehicle, or during movement.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for sharing authentication information with an unregistered device by a registered device in a wireless communication network, comprising:
    receiving an authentication information duplication request from the unregistered device by the registered device;
    obtaining authentication information from a Universal Subscriber Identity Module (USIM) by the registered device when the registered device receives the authentication information duplication request;
    transmitting the obtained authentication information to the unregistered device by the registered device; and
    registering the unregistered device in a USIM duplication database of the registered device before transmitting the obtained authentication information to the unregistered device by the registered device, when the registered device receives the authentication information duplication request.

2. The method of claim 1, further comprising:
    receiving a USIM duplication list request message from an authentication/register management server by the registered device;
    obtaining a USIM duplication list from the USIM duplication database by the registered device when the registered device receives the USIM duplication list request message; and
    transmitting the obtained USIM duplication list to the authentication/register management server by the registered device.

3. The method of claim 1, further comprising transmitting permission option information limiting an available range of services of the unregistered device to the unregistered device by the registered device.

4. The method of claim 1, wherein the registered terminal obtains only a USIM mandatory parameter from the USIM module as the authentication information, and transmits the obtained USIM mandatory parameter to the unregistered device.

5. A registered device for sharing authentication information with an unregistered device in a wireless communication network, comprising:
    a wired and wireless interface for receiving an authentication information duplication request from the unregistered device and sending the received authentication information duplication request to a main processor, receiving the authentication information corresponding to the authentication information duplication request from the main processor and transmitting the received authentication information to the unregistered device;
    a processor for obtaining the authentication information from a Universal Subscriber Identity Module (USIM) when the wired and wireless interface receives the authentication information duplication request, and sending the obtained authentication information to the wired and wireless interface; and
    a USIM duplication database storing an unregistered device list with which the registered device shares the authentication information,
    wherein the processor registers the unregistered device in the USIM duplication database, before transmitting the received authentication information to the unregistered device by the wired and wireless interface, when the registered device receives the authentication information duplication request.

6. The registered device of claim 5, wherein the processor obtains a USIM duplication list from the USIM duplication database by the registered device and transmits the obtained USIM duplication list to the wired and wireless interface, when the processor receives a USIM duplication list request message from an authentication/registration management server.

7. The registered device of claim 5, wherein the processor obtains only a USIM mandatory parameter from the USIM module as the authentication information, and transmits the obtained USIM mandatory parameter to the wired and wireless interface.

8. The registered device of claim 5, wherein the registered device transmits permission option information limiting an available range of services of the unregistered device to the unregistered device.

9. A method for synchronizing authentication information with a registered device by an authentication/register management server of a wired and wireless network, comprising:
    transmitting a Universal Subscriber Identity Module (USIM) duplication list request message to the registered device, the USIM duplication list request message indicating an unregistered terminal list with which the registered device shares the authentication information;
    receiving a USIM duplication list corresponding to the USIM duplication list request message from the registered device; and
    storing the received USIM duplication list in a USIM duplication database of the authentication/register management server.

10. The method of claim 9, further comprising determining presence of authentication from the unregistered device using the USIM duplication database, when an authentication request is received from the unregistered device.

11. An authentication/register management server of a wireless communication network synchronizing authentication information with a registered device, comprising:
    a network interface for transmitting a Universal Subscriber Identity Module (USIM) duplication list request message to the registered device, and receiving a USIM duplication list corresponding to the USIM duplication list request message from the registered device, the USIM duplication list request message indicating an unregistered device list with which the registered device shares the authentication information; and
    a processor for storing the received USIM duplication list in a USIM duplication database of the authentication/register management server.

12. The server of claim 11, wherein presence of authentication from the unregistered device is determined using the USIM duplication database, when an authentication request is received from the unregistered device.

* * * * *